United States Patent
Motohashi et al.

(10) Patent No.: US 9,886,666 B2
(45) Date of Patent: Feb. 6, 2018

(54) INFORMATION PROCESSING DEVICE, INFORMATION PROCESSING SYSTEM, INFORMATION PROCESSING METHOD AND COMPUTER-READABLE MEDIUM

(71) Applicant: NEC CORPORATION, Tokyo (JP)

(72) Inventors: Yousuke Motohashi, Tokyo (JP); Hidekazu Sakagami, Tokyo (JP); Shinichiro Kamei, Tokyo (JP); Daisuke Ohshima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 844 days.

(21) Appl. No.: 14/364,373

(22) PCT Filed: Dec. 12, 2012

(86) PCT No.: PCT/JP2012/007930
§ 371 (c)(1),
(2) Date: Jun. 11, 2014

(87) PCT Pub. No.: WO2013/088708
PCT Pub. Date: Jun. 20, 2013

(65) Prior Publication Data
US 2014/0358827 A1    Dec. 4, 2014

(30) Foreign Application Priority Data

Dec. 15, 2011   (JP) ................. 2011-274792

(51) Int. Cl.
*G06F 17/00*   (2006.01)
*G06N 5/04*   (2006.01)
*G06N 99/00*   (2010.01)

(52) U.S. Cl.
CPC ............ *G06N 5/04* (2013.01); *G06N 99/005* (2013.01)

(58) Field of Classification Search
None
See application file for complete search history.

(56) References Cited

U.S. PATENT DOCUMENTS

| 2007/0118498 | A1 | 5/2007 | Song et al. |
| 2013/0238620 | A1* | 9/2013 | Konno .............. G06F 17/30312 707/736 |
| 2014/0358827 | A1* | 12/2014 | Motohashi ........... G06N 99/005 706/11 |

FOREIGN PATENT DOCUMENTS

| EP | 0415168 A2 | 3/1991 |
| EP | 2793144 A1 * | 10/2014 ............... G06N 5/04 |

(Continued)

OTHER PUBLICATIONS

Extended European Search Report for EP Application No. EP12857998.4 dated Nov. 23, 2016.
(Continued)

*Primary Examiner* — Paulinho E Smith

(57) ABSTRACT

Provided is an information processing device to preferentially present information which each user does not have detailed knowledge, among inference results inferred from context. The information processing device includes: an inference unit that obtains inference results by applying inference rules to context information; an inference result index value calculation unit that calculates, on the basis of a knowledge level of a reading user about each inference rule used in an inference process, index values that show depth of knowledge of the reading user about the inference results comprehensively; an inference result presentation unit that presents the inference results on the basis of the index values; and a knowledge level update unit that updates the knowledge level of the reading user about each inference rule used in the inference process on the basis of evaluation information acquired.

9 Claims, 25 Drawing Sheets

(56) References Cited

FOREIGN PATENT DOCUMENTS

| JP | S62-281051 A | | 12/1987 | |
|---|---|---|---|---|
| JP | S63-66639 A | | 3/1988 | |
| JP | 02201295 A | * | 8/1990 | |
| JP | H02-201295 A | | 8/1990 | |
| JP | H2-201295 A | | 8/1990 | |
| JP | H05-035479 A | | 2/1993 | |
| JP | H5-35479 A | | 2/1993 | |
| JP | S63-066639 A | | 3/1998 | |
| JP | 2007-280301 A | | 10/2007 | |
| WO | 2009/078650 A2 | | 6/2009 | |
| WO | WO 2009078650 A2 | * | 6/2009 | ....... G06F 17/30699 |
| WO | 2011/055801 A1 | | 5/2011 | |

OTHER PUBLICATIONS

Naoki Oshugi et al., "Software Function Recommender System Based on Collaborative Filtering", Transaction of Information Processing Society of Japan, Jan. 2004, vol. 45, No. 1, pp. 267-278, with English Abstract.

International Search Report for PCT Application No. PCT/JP2012/007930, dated Feb. 12, 2013.

* cited by examiner

Fig.5

| CASE ID | CASE NAME | RELATED DOCUMENT URL | REGISTRATION DATE AND TIME | REGISTRANT |
|---|---|---|---|---|
| C-0001 | IMPOSSIBLE TO ATTACH/DETACH DUE TO MOLTEN DEFORMATION OF PLASTIC CASE | http://⋯ | 2011/6/27 10:00 | U-0001 |
| C-0002 | DAMAGE BY BURNING DUE TO OVERVOLTAGE TO REGULATOR | http://⋯ | 2011/6/27 10:00 | U-0002 |
| C-0003 | ⋯ | | 2011/6/27 10:00 | U-0003 |

Fig.6

| INFERENCE RULE ID | IF | IF | IF | THEN | CASE ID | REGISTRATION DATE AND TIME | REGISTRANT |
|---|---|---|---|---|---|---|---|
| P-0001 | PARTS = PLASTICS | TEMPERATURE = HIGH TEMPERATURE | | PARTS => MELT | NONE | 2011/6/27 10:00 | U-0001 |
| P-0002 | PARTS = REGULATOR | VOLTAGE = HIGH | | PARTS => GENERATE HEAT | NONE | 2011/6/27 10:00 | U-0002 |
| P-0003 | PARTS = REGULATOR | STATE = GENERATE HEAT | | PARTS => EMIT SMOKE | C-0002 | 2011/6/27 10:00 | U-0003 |
| P-0004 | PARTS = PLASTICS | STATE = MELT | | PARTS => MOLTEN DEFORMATION | C-0001 | 2011/6/27 10:00 | U-0001 |

Fig.7

| USER ID | INFERENCE RULE ID | KNOWLEDGE LEVEL | UPDATE DATE AND TIME |
|---|---|---|---|
| U-0001 | P-0001 | 0.6 | 2011/6/27 10:00 |
| U-0001 | P-0002 | 0.6 | 2011/6/27 10:00 |
| U-0001 | P-0003 | 0.7 | 2011/6/27 10:00 |
| U-0001 | P-0004 | 0.1 | 2011/6/27 10:00 |

Fig.8

| EVALUATION INFORMATION | KNOWLEDGE LEVEL INCREASE/DECREASE VALUE |
|---|---|
| READING | +0.1 |
| VERIFICATION EXECUTED | +0.2 |
| SPECIALIZED AREA | +0.5 |
| OVERSIGHT OCCURRED | -0.5 |
| DEFECT EMBEDDED | -1.0 |
| : | : |

Fig.12

INFERENCE RESULT

| RELATED CASE | INFERENCE BASIS | INDEX VALUE | DETAILED INFORMATION | CONFIRMATION RESULT |
|---|---|---|---|---|
| C-0001 IMPOSSIBLE TO ATTACH/DETACH DUE TO MELTING OF PLASTICS | PLASTICS => MELT | 0.06 | http://.... | NOT INPUTTED |
| C-0009 IMPOSSIBLE TO ATTACH/DETACH DUE TO DEFORMATION | SLIDE TYPE => WEAR DUE TO REPEATED OPERATION | 0.08 | http://.... | ALREADY INPUTTED |
| C-0008 DAMAGE BY FRAGMENT | SLIDE TYPE => JOINT BREAKS | 0.3 | http://.... | NOT INPUTTED |
| C-0007 DAMAGE DUE TO SHARP SECTION | SLIDE TYPE => JOINT BREAKS | 0.5 | http://.... | NOT INPUTTED |

Fig.16

| INFERENCE RULE ID | IF | IF | IF | THEN | PROBABILITY OF OCCURRENCE | CASE ID | REGISTRATION DATE AND TIME | REGISTRANT |
|---|---|---|---|---|---|---|---|---|
| P-0001 | PARTS = PLASTICS | TEMPERATURE = HIGH TEMPERATURE | | PARTS ⇒ MELT | 1.0 | NONE | 2011/6/27 10:00 | U-0001 |
| P-0002 | PARTS = REGULATOR | VOLTAGE = HIGH | | PARTS ⇒ GENERATE HEAT | 0.5 | NONE | 2011/6/27 10:00 | U-0002 |
| P-0003 | PARTS = REGULATOR | STATE = GENERATE HEAT | | PARTS ⇒ EMIT SMOKE | 0.7 | C-0002 | 2011/6/27 10:00 | U-0003 |
| P-0004 | PARTS = PLASTICS | STATE = MELT | | PARTS ⇒ MOLTEN DEFORMATION | 0.8 | C-0001 | 2011/6/27 10:00 | U-0001 |

Fig.17

| USER ID | INFERENCE RULE ID | CASE ID | KNOWLEDGE LEVEL | UPDATE DATE AND TIME |
|---|---|---|---|---|
| U-0001 | P-0001 | | 0.6 | 2011/6/27 10:00 |
| U-0001 | P-0002 | | 0.6 | 2011/6/27 10:00 |
| U-0001 | P-0003 | | 0.7 | 2011/6/27 10:00 |
| U-0001 | P-0004 | | 0.1 | 2011/6/27 10:00 |
| U-0001 | | C-0001 | 0.4 | 2011/6/27 10:00 |
| U-0001 | | C-0002 | 0.2 | 2011/6/27 10:00 |
| U-0001 | | C-0003 | 0.1 | 2011/6/27 10:00 |

Fig.18

| CASE ID | CASE NAME | RELATED DOCUMENT URL | DEGREE OF IMPORTANCE | REGISTRATION DATE AND TIME | REGISTRANT |
|---|---|---|---|---|---|
| C-0001 | IMPOSSIBLE TO ATTACH/DETACH DUE TO MOLTEN DEFORMATION OF PLASTIC CASE | http://··· | 1.0 | 2011/6/27 10:00 | U-0001 |
| C-0002 | DAMAGE BY BURNING DUE TO OVERVOLTAGE TO REGULATOR | http://··· | 0.7 | 2011/6/27 10:00 | U-0002 |
| C-0003 | ··· | | 0.5 | 2011/6/27 10:00 | U-0003 |

Fig.22

| ACTION HISTORY INFORMATION | EVALUATION INFORMATION |
|---|---|
| READING TIME > 10S | READING |
| READING TIME > 100S && VERIFICATION RESULT INPUTTED | VERIFICATION EXECUTED |
| COMMENT INPUTTED | INDICATION INPUTTED |
| READING TIME > 10S && ATTACHED FILE OPENED | DETAILED CHECK |
| : | : |

Fig.23

| EVALUATION INFORMATION | KNOWLEDGE LEVEL ALTERATION VALUE |
|---|---|
| READING | +0.1 |
| VERIFICATION EXECUTED | +0.2 |
| DETAILED CHECK | +0.3 |
| INDICATION INPUTTED | +0.4 |
| : | : |

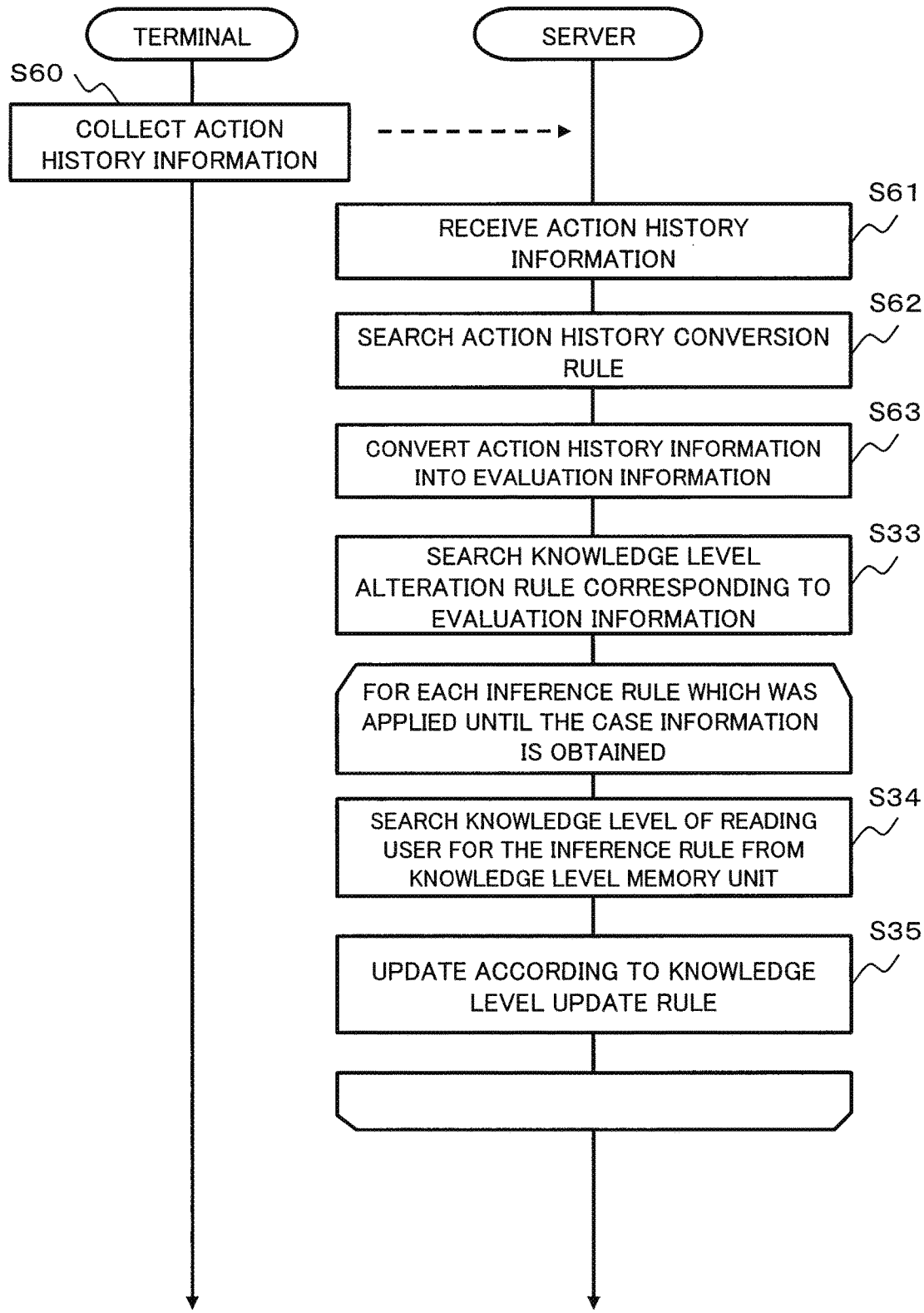

INFORMATION PROCESSING DEVICE, INFORMATION PROCESSING SYSTEM, INFORMATION PROCESSING METHOD AND COMPUTER-READABLE MEDIUM

This application is a National Stage Entry of PCT/JP2012/007930 filed on Dec. 12, 2012, which claims priority from Japanese Patent Application 2011-274792 filed on Dec. 15, 2011, the contents of all of which are incorporated herein by reference, in their entirety.

TECHNICAL FIELD

The present invention relates to an information processing device, an information processing system, an information processing method and a computer program that presents inference results obtained by inference processing.

BACKGROUND ART

An information processing device is known that obtains inference results by applying inference rules to context information inputted and presents the inference results obtained. Here, the context information is information that becomes an application target of the inference rules and is, for example, text information or image information included in document data, measurement data outputted from sensor equipment, operation log data about a device or application software and so on.

As an inference method that such information processing device uses, there exists, for example, deductive inference. In case the deductive inference is used, the information processing device holds an inference rule, for example, shown in an IF-THEN form as indicated by the following expression (1).

IF Temperature>100&liquid==water

THEN liquid->(changes)->gas     (1)

First line of expression (1) shows a condition (IF information) that says "in case temperature is no smaller than 100 degrees centigrade and liquid is water." Also, second line of expression (1) shows a phenomenon (THEN information) that says, in case the IF information is satisfied, "liquid changes into gas." The information processing device that uses such inference rule infers, in case the context information inputted satisfies the IF information, that the THEN information set to the IF information concerned occurs.

Such information processing device holds in advance, for example, in designing of a certain device, case information such as important cases in the past, defect cases and so on, and conditions that such cases can occur as inference rules. And such information processing device extracts context information from design document data of the device and applies the inference rules to the context information extracted. In this case, such information processing device can present defect cases that can occur by designing on the basis of such design document data, important cases in the past related to the design concerned and so on as the inference results. As a result, such information processing device can support work of a user who checks contents of the design document data.

By the way, in such information processing device, in case the inference rules are accumulated in large quantities, a great deal of inference results will be obtained. And when the inference results presented become large in quantity, a problem occurs that the inference results become difficult to grasp for the user. As a related technology that solves such a problem, there is a technology that presents a large quantity of information after narrowing it down to a number that is easy to grasp for the user.

For example, in patent document 1, an information processing device is described that accumulates defect occurrence history in a production process in the past, calculates frequency of occurrence, degree of influence and degree of detection for each class of a fault on the basis the defect occurrence history accumulated, and calculates priority of danger by integrating the calculated information. And the information processing device presents to the user fault information sorted by the priority of danger. Accordingly, even in case there is a large quantity of fault information such the user cannot grasp all, the information processing device can present with priority the fault information with high priority of danger to the user.

Also, in non-patent document 1, an information processing device is described that presents, by collaborative filtering using an access history of a plurality of users about a plurality of information, information that is unknown and useful for each user. Even in case there is a large quantity of information such that the user cannot grasp all, the information processing device can present information that is unknown and useful for the user among others.

Patent Document 1: Japanese Unexamined Patent Application Publication No. 2007-280301

Non-Patent Document 1: Naoki Ohsugi et al., "Software Function Recommender System Based on Collaborative Filtering", Transaction of Information Processing Society of Japan Vol. 45, No. 1, 2004.

SUMMARY OF INVENTION

Technical Problem

However, while the information processing device described in the patent document 1 can present the fault information with high priority of danger to the user, there is a following problem.

Even for the fault information with high priority of danger, depending on the user, there is a case when detailed knowledge about the fault information is possessed by the user. On the other hand, even for the fault information with low priority of danger, depending on the user, there is a case when a mistake related to such fault information may be easy to occur since detailed knowledge about the fault information is not possessed by the user. However, the information processing device described in the patent document 1 does not necessarily present the fault information for which each user does not have detailed knowledge at higher position.

Also, the information processing device described in the non-patent document 1 regards information that each user has not accessed as unknown information and can present information that is determined to be useful for each user among others, though, there is a following problem.

For example, assume a case when the information processing device described in the non-patent document 1 makes defect case information in designing as a target. There is a case when a certain user may, even if defect case information related to a certain kind of context information is already being accessed, when the kind of the context information is different, overlook such defect case information. In such a case, it can be said that the user does not possess truly detailed knowledge for the defect case information. However, since the information processing device described in the non-patent document 1 does not present the information that the user already accessed, there is a case when the defect case information that the user does not have detailed knowledge cannot be presented.

Also, there is a case when information that a certain user does not access yet is similar to the information that the user has already accessed. Even in this case, the information processing device described in the non-patent document 1 may determine the information similar to the information that is already accessed to be useful and present it. There is a case when the user already has detailed knowledge for such similar information. Accordingly, there is a case when the information processing device described in the non-patent document 1 presents the information that the user already has detailed knowledge.

Thus, even if the technologies described in the patent document 1 and the non-patent document 1 are applied to the information processing device that presents inference results, there is a problem that there exists a case when inference results for which each user does not have detailed knowledge cannot be presented with priority.

The present invention has been made in order to solve the problem described above, and makes it a main object to provide the information processing device and so on that presents information for which each user does not have detailed knowledge with priority among inference results inferred from the context.

Technical Solution

An information processing device of the present invention includes: an inference unit that obtains inference results by applying inference rules to context information; an inference result index value calculation unit that, by using information that shows a reading user who reads the inference results, acquires a knowledge level of the reading user about each inference rule that was applied until the inference results are obtained, and on the basis of each knowledge level acquired, calculates index values that show depth of the knowledge of the reading user about the inference results comprehensively, an inference result presentation unit that presents the inference results on the basis of the index values calculated by the inference result index value calculation unit; and a knowledge level update unit that, for each inference rule that was applied until the inference results are obtained, updates the knowledge level of the reading user about the inference rule concerned on the basis of evaluation information in which the degree of the knowledge that the reading user possesses is evaluated about the inference results presented by the inference result presentation unit.

Also, an information processing system of the present invention includes: the information processing device described above and a terminal that collects context information and sends it to the information processing device, outputs the inference results presented from the information processing device to an output device, and sends the evaluation information inputted from an input device to the information processing device.

Also, an information processing method of the present invention: obtains inference results by applying inference rules memorized in advance to context information inputted; acquires a numerical value memorized in advance as a knowledge level that shows depth of the knowledge that a reading user who reads the inference results possesses for each inference rule that was applied until the inference results are obtained; calculates index values that show the depth of the knowledge of the reading user about the inference results comprehensively on the basis of each knowledge level acquired; presents the inference results on the basis of the index value; acquires, for the inference results that are presented, evaluation information in which degree of the knowledge that the reading user possesses is evaluated; and updates, for each inference rule that was applied until the inference results are obtained, a numerical value memorized as the knowledge level of the reading user about the inference rule concerned on the basis of the evaluation information.

Also, a computer program of the present invention makes a computer device execute: a context information acquisition processing that acquires context information; an inference processing that obtains inference results by applying inference rules memorized in a memory device in advance to context information; an inference result index value calculation processing that acquires a numerical value memorized in the memory device in advance as a knowledge level that shows depth of the knowledge that a reading user who reads the inference results possesses for each inference rule that was applied until the inference results are obtained, and calculates index values that show the depth of the knowledge of the reading user about the inference results comprehensively on the basis of each knowledge level acquired; an inference result presentation processing that presents the inference results on the basis of the index value; an evaluation information acquisition processing that acquires, for the inference results presented by the inference result presentation processing, evaluation information in which degree of the knowledge that the reading user possesses is evaluated; and a knowledge level update processing that updates, for each inference rule that was applied until the inference results are obtained, a numerical value memorized in a memory device as the knowledge level of the reading user about the inference rule concerned on the basis of the evaluation information.

Advantageous Effects

The present invention can, among inference results inferred from a context, present information for which each user does not have detailed knowledge with priority.

BRIEF DESCRIPTION OF DRAWINGS

FIG. 5 is a figure indicating an example of information stored in a case information memory unit in the second exemplary embodiment of the present invention.

FIG. 6 is a figure indicating an example of information stored in an inference rule memory unit in the second exemplary embodiment of the present invention.

FIG. 7 is a figure indicating an example of information stored in a knowledge level memory unit in the second exemplary embodiment of the present invention.

FIG. 8 is a figure indicating an example of information stored in a knowledge level alteration rule memory unit in the second exemplary embodiment of the present invention.

FIG. 12 is a figure indicating an example of an inference result presentation screen in the second exemplary embodiment of the present invention.

FIG. 13 is a figure indicating an example of an evaluation information input screen in the second exemplary embodiment of the present invention.

FIG. 16 is a figure indicating an example of information stored in a knowledge level memory unit in the third exemplary embodiment of the present invention.

FIG. 17 is a figure indicating an example of information stored in an inference rule memory unit in the third exemplary embodiment of the present invention.

FIG. 18 is a figure indicating an example of information stored in a case information memory unit in the third exemplary embodiment of the present invention.

FIG. 22 is a figure indicating an example of information stored in an action history conversion rule memory unit in the fourth exemplary embodiment of the present invention.

FIG. 23 is a figure indicating an example of information stored in a knowledge level alteration rule memory unit in the fourth exemplary embodiment of the present invention.

FIG. 24 is a flow chart explaining knowledge level update operation of an information processing system according to the fourth exemplary embodiment of the present invention.

DESCRIPTION OF EMBODIMENTS

Hereinafter, each exemplary embodiment of the present invention will be explained in detail with reference to drawings.

(The First Exemplary Embodiment)

Figure 1:
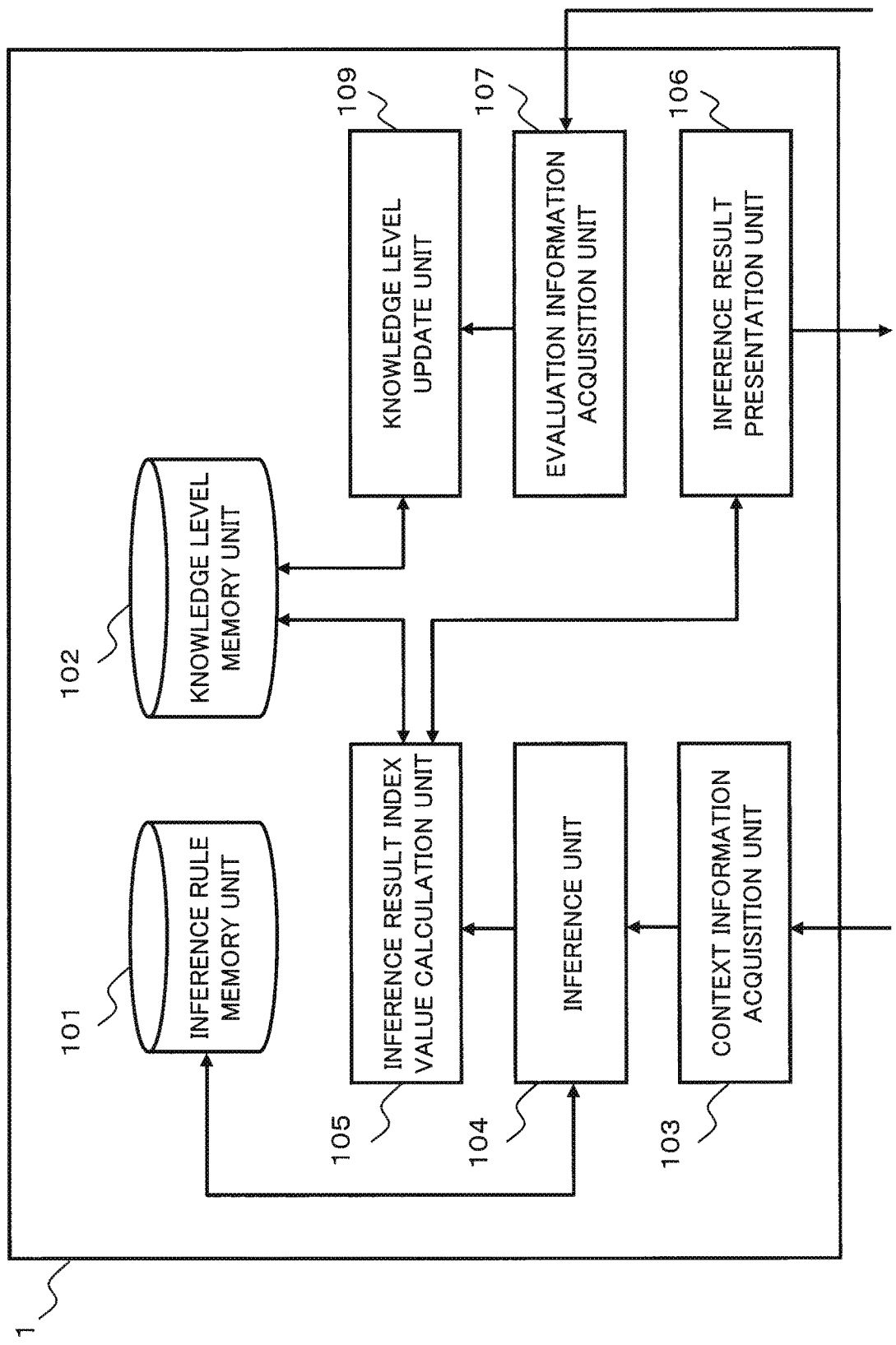
FIG. 1 is a functional block diagram of an information processing device according to a first exemplary embodiment of the present invention.
Figure 25:
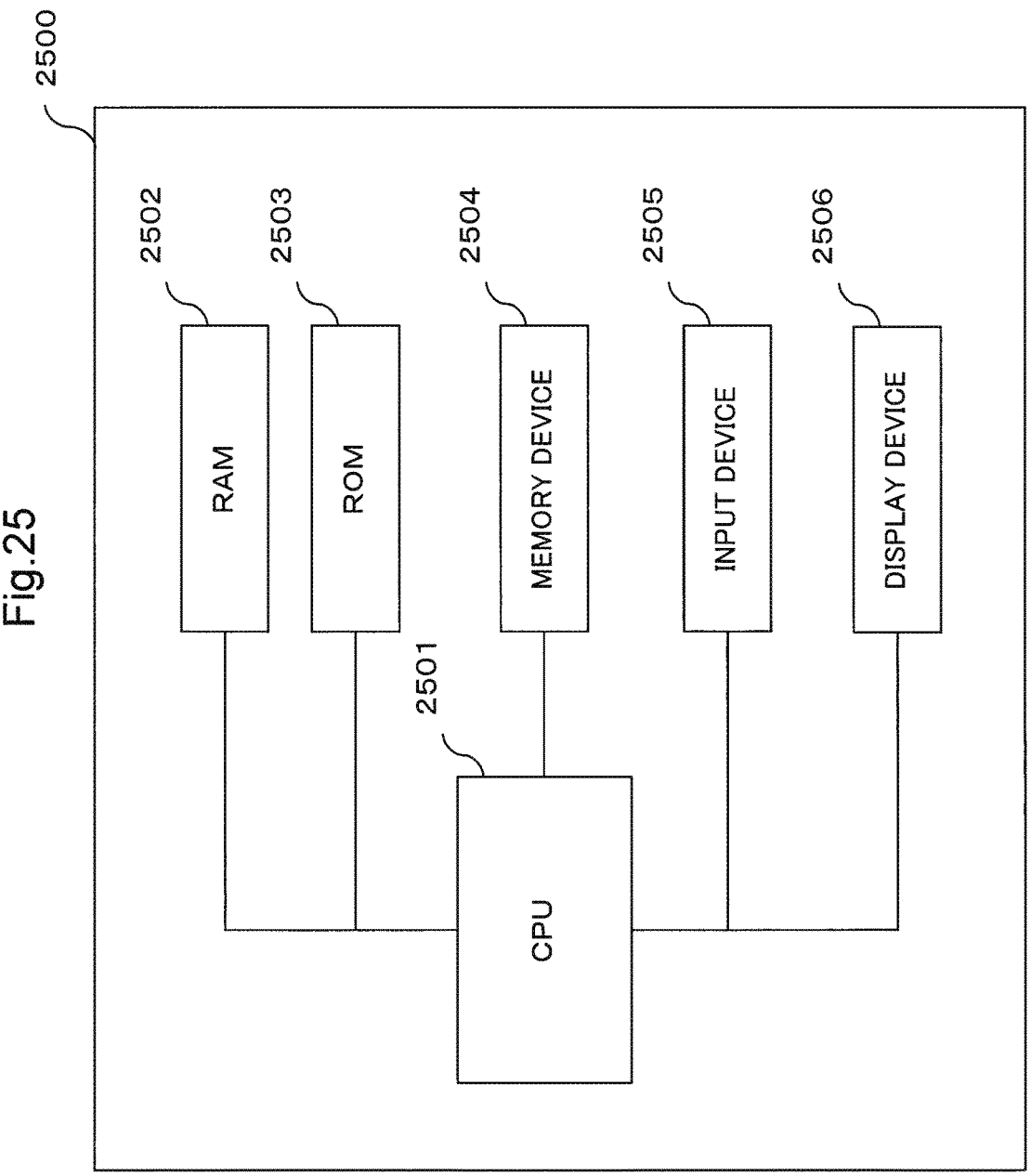
FIG. 25 is a hardware block diagram of an information processing device according to the first exemplary embodiment of the present invention.

Functional block configuration of an information processing device 1 according to the first exemplary embodiment of the present invention is indicated in FIG. 1. In FIG. 1, the information processing device 1 includes: an inference rule memory unit 101, a knowledge level memory unit 102, a context information acquisition unit 103, an inference unit 104, an inference result index value calculation unit 105, an inference result presentation unit 106, an evaluation information acquisition unit 107 and a knowledge level update unit 109. Next, hardware configuration of the information processing device 1 is indicated in FIG. 25. In FIG. 25, the information processing device 1 is configured from a computer 2500 equipped with CPU (Central Processing Unit) 2501, RAM (Random Access Memory) 2502, ROM (Read Only Memory) 2503, a memory device 2504 such as a hard disk, an input device 2505 and a display device 2506. Also, the inference rule memory unit 101 and the knowledge level memory unit 102 are configured from the memory device 2504. Also, the context information acquisition unit 103 and the evaluation information acquisition unit 107 are configured from the input device 2505 and the CPU 2501 that reads a computer program memorized in the ROM 2503 or the memory device 2504 into RAM 2502 and executes it. Also, the inference unit 104, the inference result index value calculation unit 105 and the knowledge level update unit 109 are configured from the CPU 2501 that reads a computer program memorized in the ROM 2503 or the memory device 2504 into the RAM 2502 and execute it. Also, the inference result presentation unit 106 is configured from the display device 2506 and the CPU 2501 that reads a computer program memorized in the ROM 2503 or the memory device 2504 into the RAM 2502 and executes it. Further, hardware configuration that configures each function block is not limited to the configuration described above.

The inference rule memory unit 101 memorizes no smaller than one inference rule. Such inference rule shows a phenomenon that occurs corresponding to the contents of context information described below. The inference rule may be, for example, a rule of an IF-THEN form including a condition (IF information) and a phenomenon (THEN information) that occurs when the condition concerned is satisfied. The inference rule memory unit 101 memorizes such inference rule with an inference rule ID that identifies the inference rule concerned.

The knowledge level memory unit 102 memorizes a knowledge level that shows depth of the knowledge of each user about each inference rule. Specifically, the knowledge level memory unit 102 associates the inference rule ID, user's identification information (user ID) and the knowledge level that shows the depth of the knowledge of the user concerned about the inference rule concerned, and memorizes a plurality of records that are associated. Hereinafter, in each exemplary embodiment of the present invention, explanation will continue supposing that the smaller the numerical value of the knowledge level is, it shows the less the user is knowledgeable about the inference rule. Also, each knowledge level memorized in the knowledge level memory unit 102 can be updated by the knowledge level update unit 109 described below. Also, each knowledge level memorized in the knowledge level memory unit 102 may be registered in advance or a predetermined value such as 0 may be set as an initial value.

The context information acquisition unit 103 acquires context information. The context information is information that becomes a target of inference and it may be, for example, text information or image information included in document data, measurement data outputted from sensor equipment, operation log data about a device or application software and so on.

By applying the inference rules memorized in the inference rule memory unit 101 to the context information acquired, the inference unit 104 obtains inference results. For example, the inference unit 104 searches the inference rule that possesses IF information that agrees with the context information. And the inference unit 104 presumes that THEN information that the inference rule searched possesses to occur. Also, in case the THEN information of the inference rule applied satisfies the IF information of other inference rules, the inference unit 104 may repeat a chain reaction of the inference processing that applies other inference rules further. Also, in case there is a plurality of inference rules applicable to the context information acquired or to the THEN information of the inference rule applied, the inference unit 104 may execute a plurality of inference processing on the basis of the respective inference rules.

The inference result index value calculation unit 105 calculates an index value of the inference result using the knowledge level of a reading user about each inference rule that was applied until the inference result is obtained. Here, the reading user is a user who reads the inference result. And the index value of the inference result is a numerical value showing depth of the knowledge of the reading user about the inference result comprehensively.

Specifically, the inference result index value calculation unit 105 may acquire the user ID of the reading user from the inference result presentation unit 106 described below. And the inference result index value calculation unit 105 may acquire the knowledge level that is associated with each inference rule ID and the reading user ID from the knowledge level memory unit 102. And the inference result index value calculation unit 105 may calculate the index value of the inference result for the reading user on the basis of each knowledge level acquired. For example, the inference result index value calculation unit 105 may calculate a multiplied value of each knowledge level acquired as the index value. As described above, when the smaller the numerical value of the knowledge level is, it shows the less the reading user is knowledgeable about the inference rules, concerning the inference result that was led using the inference rules about which the reading user does not have detailed knowledge, the numerical value of the index value as the multiplied value becomes smaller. Here, it can be considered that the inference result that was led by the inference process about which the reading user does not have the detailed knowledge is more useful for the reading user. Accordingly, in this case, concerning the index value about the inference result, the smaller the value is, it indicates the higher a degree of usefulness for the user is.

Also, when a plurality of inference results is obtained, the inference result index value calculation unit 105 calculates the index value for the reading user about each inference result.

The inference result presentation unit 106 presents the inference results on the basis of the index values calculated by the inference result index value calculation unit 105. For example, the inference result presentation unit 106 may decide an order to present the inference results on the basis of the index values. When the smaller the value of the index value is, it shows the higher the degree of usefulness for the reading user is, the inference result presentation unit 106 may present the inference results in ascending order of the index values.

Also, the inference result presentation unit 106 acquires the user ID of the reading user who reads the inference results and notifies it to the inference result index value calculation unit 105. For example, the inference result presentation unit 106 may display an input screen of a reading user ID, and in case the reading user ID already registered is inputted, present the inference results.

The evaluation information acquisition unit 107 acquires evaluation information that evaluated the degree of the knowledge that the reading user possesses about the inference results presented by the inference result presentation unit 106. For example, the evaluation information acquisition unit 107 may acquire the evaluation information showing whether or not the inference result is known to the reading user via the input device.

The knowledge level update unit 109 updates a numerical value memorized in the knowledge level memory unit 102 as the knowledge level of the reading user about each inference rule that was applied until the inference results are obtained on the basis of the evaluation information acquired by the evaluation information acquisition unit 107. For example, in case the evaluation information showing whether or not it is known is acquired by the evaluation information acquisition unit 107, when the evaluation information shows "known", the knowledge level update unit 109 may add a predetermined value to the knowledge level. Also, when the evaluation information shows "not known", the knowledge level update unit 109 may subtract a predetermined value from the knowledge level.

Operation of the information processing device 1 configured as above will be explained with reference to drawings.

Figure 2:
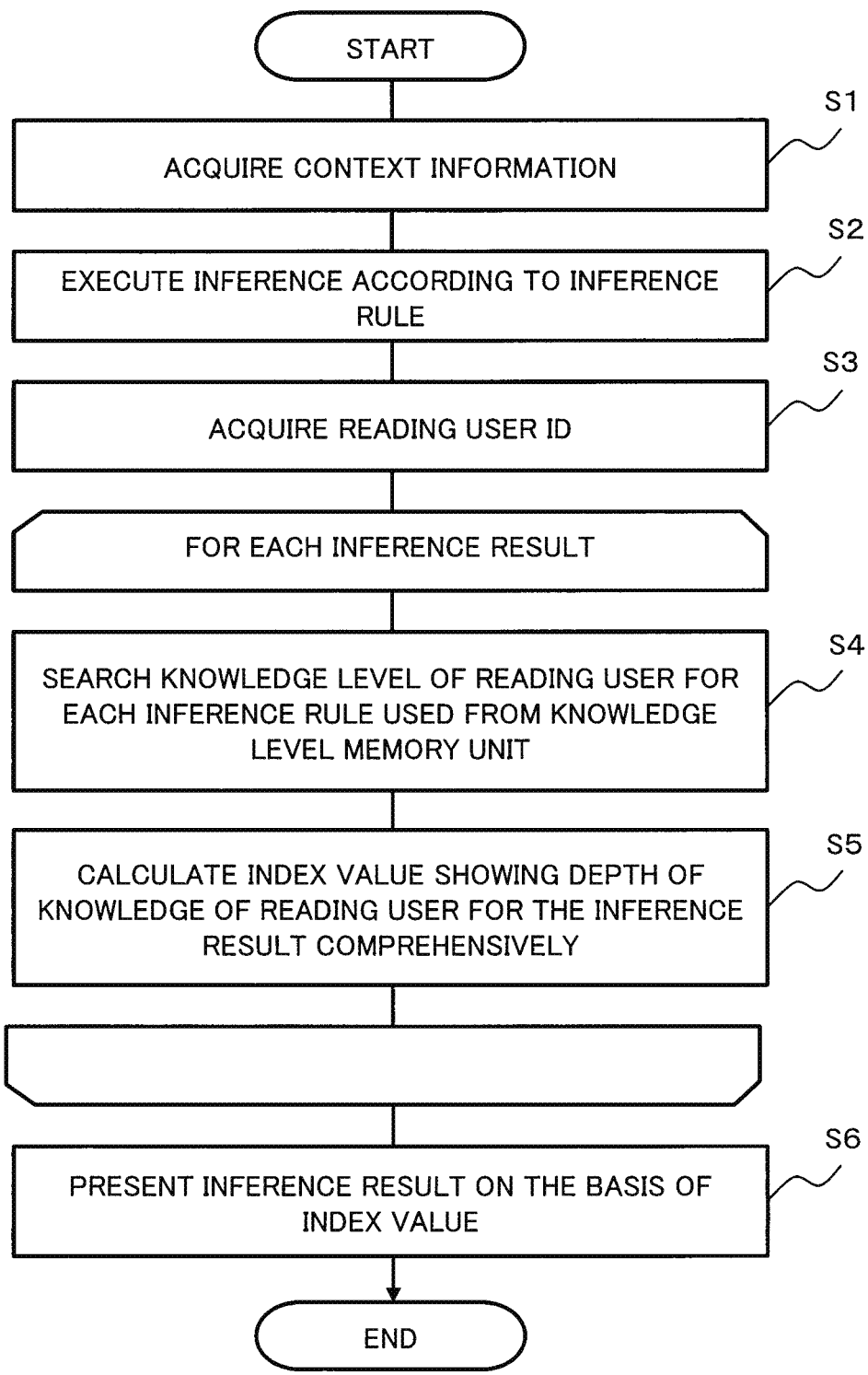
FIG. 2 is a flow chart explaining inference result presentation operation of an information processing device according to the first exemplary embodiment of the present invention.

First, inference result presentation operation of the information processing device 1 is indicated in FIG. 2. FIG. 2 is a flow chart explaining the inference result presentation operation of the information processing device according to the first exemplary embodiment of the present invention. In FIG. 2 and flow charts that will be referred below, a pair of two hexagons shows that a series of processing inserted in between is repeated (looped). Here, a hexagon that is of a rectangle shape of which upper corners are cut off shows start of the repeated processing. And a hexagon that is of a rectangle shape of which lower corners are cut off shows end of the repeated processing. Further, a target of the repeated processing may be described in the hexagon showing start of the repeated processing.

In FIG. 2, first, the context information acquisition unit 103 acquires context information (Step S1). For example, the context information acquisition unit 103 may extract the context information from document data given.

Next, by applying the inference rules memorized in the inference rule memory unit 101 to the context information acquired in Step S1, the inference unit 104 obtains inference results (Step S2). At that time, as described above, the inference unit 104 may acquire the inference results by executing inference processing in a chain reaction.

Next, the inference result index value calculation unit 105 acquires a reading user ID who reads the inference results (Step S3). As described above, the inference result index value calculation unit 105 may acquire the reading user ID from the inference result presentation unit 106.

Next, the inference result index value calculation unit 105 executes processing of Steps S4-S5 for each inference result obtained in Step S2.

Here, first, the inference result index value calculation unit 105 searches the knowledge level of the reading user about each inference rule that was used by the inference unit 104 until the inference result is obtained from the knowledge level memory unit 102 (Step S4).

Next, the inference result index value calculation unit 105 calculates an index value showing the depth of the knowledge of the reading user about the inference result comprehensively on the basis of the knowledge level searched in Step S4 (Step S5). For example, as described above, the inference result index value calculation unit 105 may calculate a multiplied value of the knowledge level of the reading user about each inference rule that was used until the inference result is obtained as the index value.

Next, the inference result presentation unit 106 presents the inference results on the basis of the index values calculated by the inference result index value calculation unit 105 (Step S6). For example, the inference result presentation unit 106 may present the inference results in ascending order of the index values.

As above, the information processing device 1 ends the inference result presentation operation.

Figure 3:
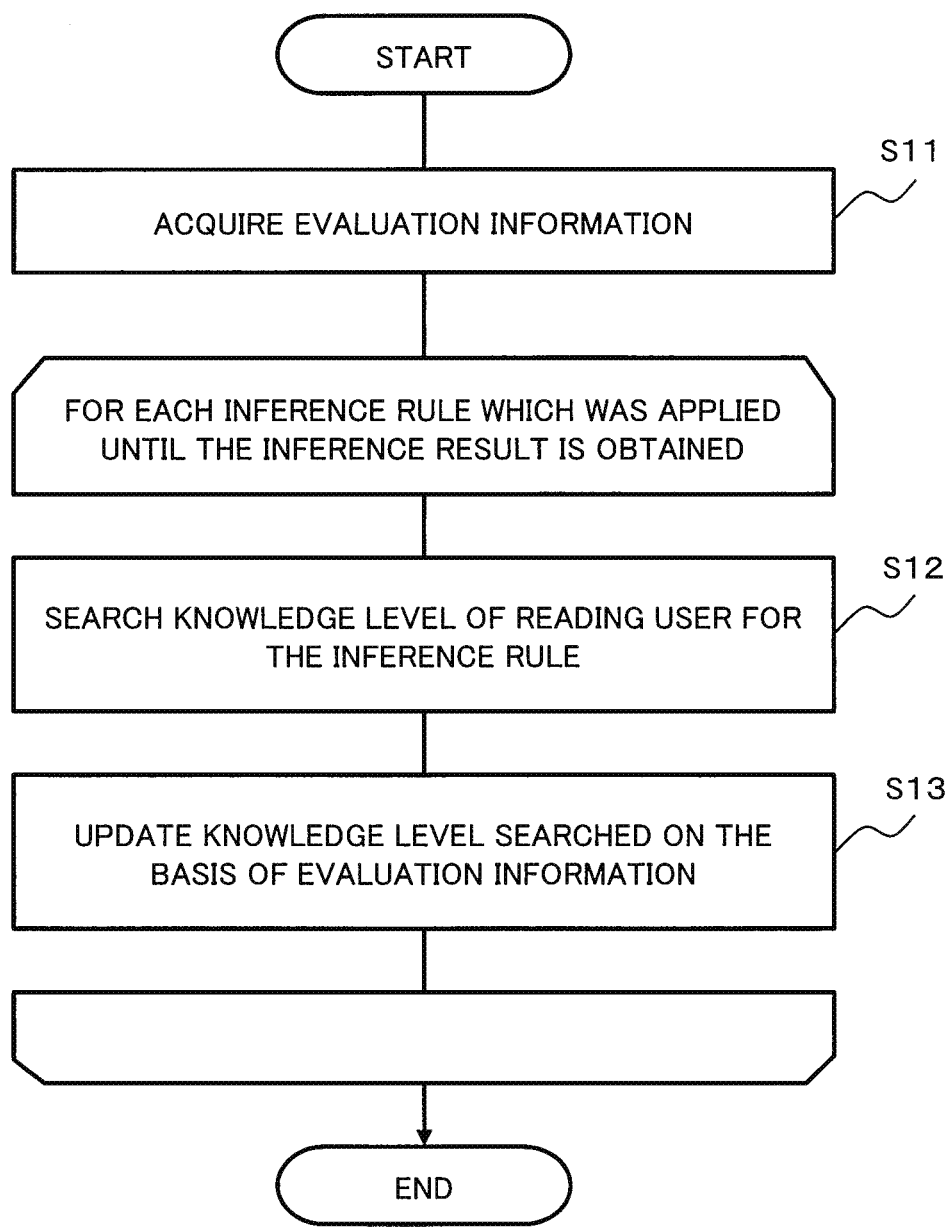
FIG. 3 is a flow chart explaining knowledge level update operation of an information processing device according to the first exemplary embodiment of the present invention.

Next, knowledge level update operation of the information processing device 1 is indicated in FIG. 3. FIG. 3 is a flow chart explaining the knowledge level update operation of the information processing device according to the first exemplary embodiment of the present invention.

In FIG. 3, first, the evaluation information acquisition unit 107 acquires evaluation information of the reading user about one among the inference results presented in Step S6 of FIG. 2 (Step S11). For example, as described above, by displaying on the display device so that whether or not the inference result is known to the reading user is selectable, the evaluation information acquisition unit 107 may acquire the evaluation information showing whether or not it is known via the input device.

Next, the knowledge level update unit 109 executes processing of the following Steps S12-S13 about each inference rule that was used in Step S2 of FIG. 2 until the inference result is obtained.

Here, first, the knowledge level update unit 109 searches the knowledge level that is associated with the inference rule ID and the reading user ID from the knowledge level memory unit 102 (Step S12).

And the knowledge level update unit 109 updates the knowledge level of the record searched on the basis of a kind of the evaluation information acquired in Step S11 (Step S13). For example, corresponding to the evaluation information acquired in Step S11, the knowledge level update unit 109 may add or subtract a predetermined value to or from the knowledge level of the record concerned.

As above, the information processing device 1 ends the knowledge level update operation. Further, in case a plurality of inference results is presented, the information processing device 1 may execute such knowledge level update operation for each inference result.

Further, the information processing device 1 may be without part or all of the inference rule memory unit 101, the knowledge level memory unit 102, the context information acquisition unit 103 and the evaluation information acquisition unit 107. Also, these components may be outside of the information processing device 1. Further, part or all of the inference rules, the knowledge levels, the context information and the evaluation information may be given to the information processing device 1 from outside.

Next, effects of the first exemplary embodiment of the present invention will be described.

The information processing device according to the first exemplary embodiment of the present invention can present, among information inferred from the context, information of which the user does not have detailed knowledge with priority.

The reason is because: the knowledge level memory unit stores the knowledge level of the reading user about the inference rules; the inference result index value calculation unit calculates the index value showing the depth of the knowledge of the reading user about the inference results comprehensively on the basis of the knowledge level of the reading user about each inference rule used by the inference process; and the inference result presentation unit presents the inference results on the basis of the index values calculated. Accordingly, the information processing device according to the first exemplary embodiment will judge the degree of usefulness of the inference results for the reading user and present it on the basis of the depth of the knowledge of the reading user about the inference process. As a result, because the information processing device according to the first exemplary embodiment can, even for the inference result known to the reading user, present it with priority if the inference result is one of which the knowledge level about the inference process is low.

Also, the further reason is because the evaluation information acquisition unit acquires the evaluation information of the reading user about the inference results presented, and the knowledge level update unit updates the knowledge level of the reading user about each inference rule used in the inference process on the basis of the evaluation information of the reading user. Accordingly, the information processing device according to the first exemplary embodiment can update the knowledge level of the reading user about each inference rule used in the inference process on the basis of the evaluation of the degree of the knowledge of the reading user about the inference results. For example, when evaluation information that the inference result presented is known is obtained, the information processing device according to the first exemplary embodiment can update the knowledge level of the reading user about each inference rule until the inference result is obtained higher than before. Also, when evaluation information that the inference result presented is unknown is obtained, the information processing device according to the first exemplary embodiment can update the knowledge level of the reading user about each inference rule lower than before. As a result, because the information processing device according to the first exemplary embodiment can calculate the index values about other inference results in which such inference rules are used in the inference process with higher accuracy.

(The Second Exemplary Embodiment)

Next, the second exemplary embodiment of the present invention will be explained in detail with reference to drawings. In the second exemplary embodiment, an information processing system including a server as an information processing device of the present invention and a terminal will be explained. Further, in each drawing referred to in the explanation of the second exemplary embodiment, same codes are assigned to the same configurations and steps that operate similarly as the first exemplary embodiment of the present invention, and detailed explanation in the second exemplary embodiment is omitted.

An information processing system 20 according to the second exemplary embodiment of the present invention includes a server 2 as the information processing device of the present invention and a terminal 8. Function block of each device is indicated in FIG. 4.

Figure 4:
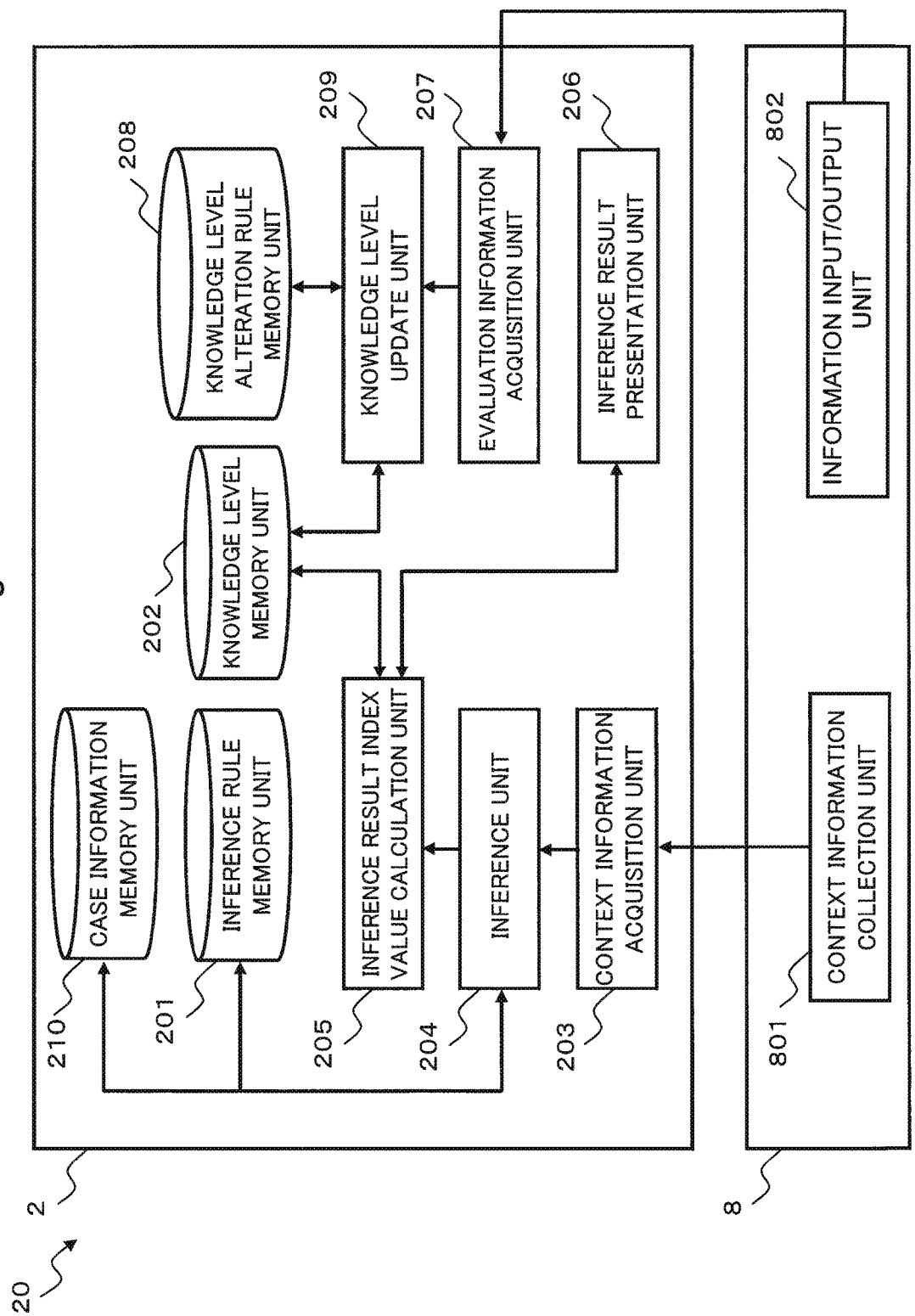
FIG. 4 is a functional block diagram of an information processing device according to a second exemplary embodiment of the present invention.
Figure 26:
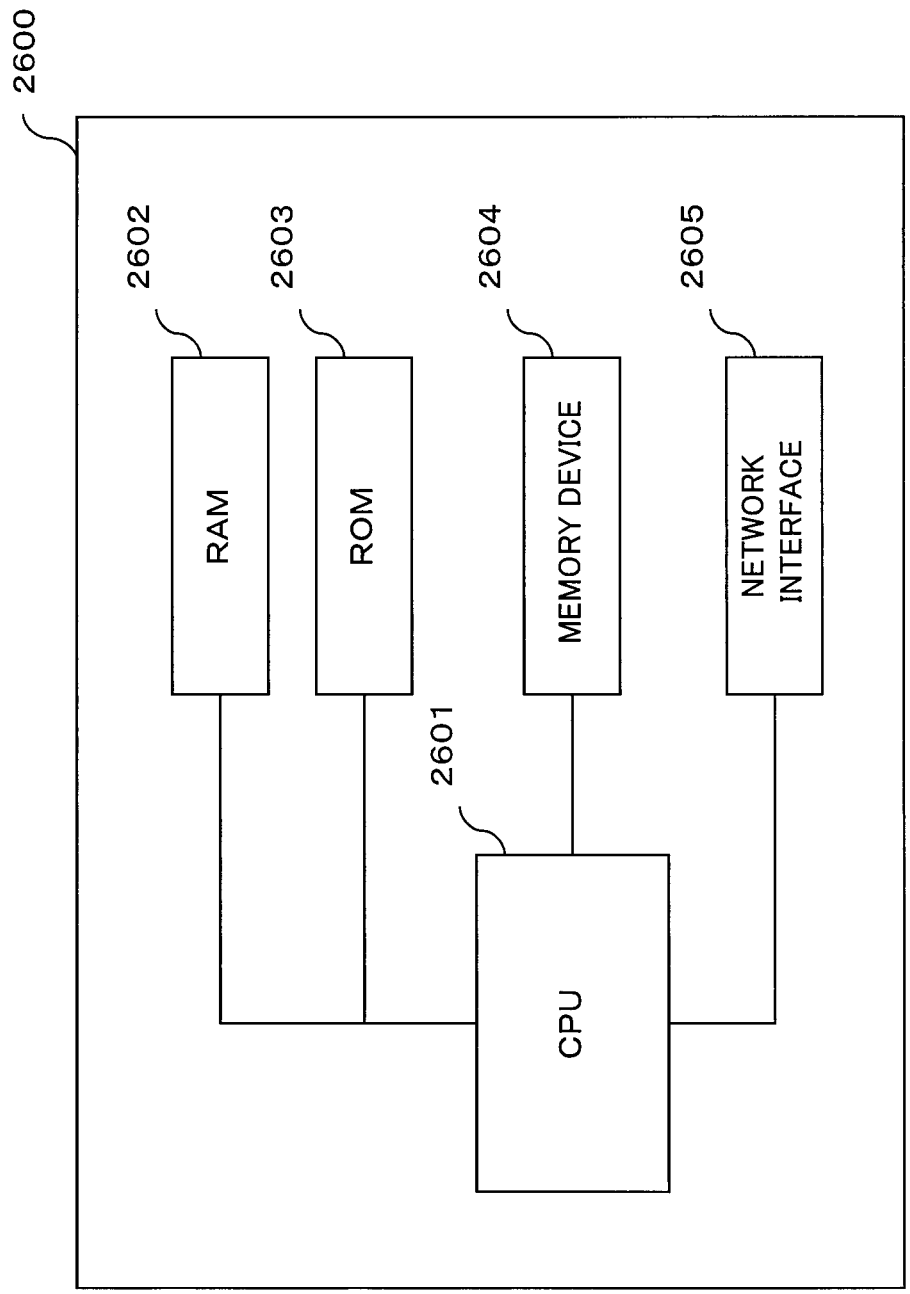
FIG. 26 is a hardware block diagram of a server according to the second to the fourth exemplary embodiment of the present invention.

In FIG. 4, the server 2 is equipped with an inference rule memory unit 201, a knowledge level memory unit 202, a context information acquisition unit 203, an inference unit 204, an inference result index value calculation unit 205, an inference result presentation unit 206, an evaluation information acquisition unit 207, a knowledge level alteration rule memory unit 208, a knowledge level update unit 209 and a case information memory unit 210. Next, hardware configuration of the server 2 is indicated in FIG. 26. In FIG. 26, the server 2 is configured from a computer 2600 equipped with CPU 2601, RAM 2602, ROM 2603, a memory device 2604 and a network interface 2605. Also, the inference rule memory unit 201, the knowledge level memory unit 202, the knowledge level alteration rule memory unit 208 and the case information memory unit 210 are configured from the memory device 2604. Also, the context information acquisition unit 203, the evaluation information acquisition unit 207 and the inference result presentation unit 206 are configured from the network interface 2605 and the CPU 2601 that reads a computer program memorized in the ROM 2603 or the memory device 2604 into the RAM 2602 and executes it. Also, the inference unit 204, the inference result index value calculation unit 205 and the knowledge level update unit 209 are configured from the CPU 2601 that reads a computer program memorized in the ROM 2603 or the memory device 2604 into the RAM 2602 and executes it.

Figure 27:
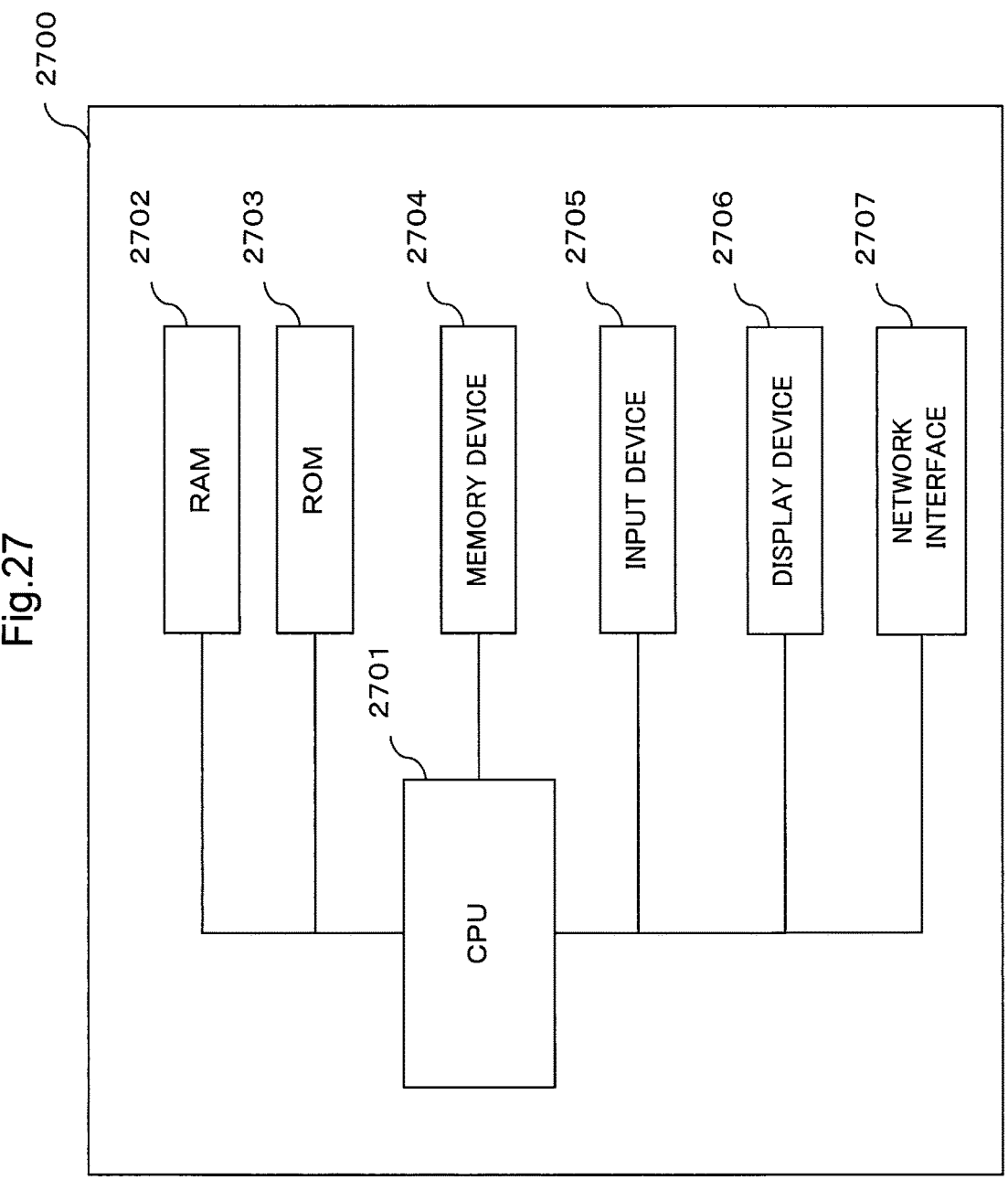
FIG. 27 is a hardware block diagram of a terminal according to the second to the fourth exemplary embodiment of the present invention.

Also, the terminal 8 is equipped with a context information collection unit 801 and an information input/output unit 802. Next, hardware configuration of the terminal 8 is indicated in FIG. 27. In FIG. 27, the terminal 8 is configured from a computer 2700 equipped with CPU 2701, RAM 2702, ROM 2703, a memory device 2704, an input device 2705, a display device 2706 and a network interface 2707. The context information collection unit 801 is configured from the network interface 2707 and the CPU 2701 that reads and a computer program memorized in the ROM 2703 or the memory device 2704 into the RAM 2702 and executes it. The information input/output unit 802 is configured from the input device 2705, the display device 2706, the network interface 2707 and the CPU 2701 that reads a computer program memorized in the ROM 2703 or the memory device 2704 into the RAM 2702 and executes it.

Further, hardware configuration that configures each function block of each device is not limited to the configuration described above. Also, the server 2 and the terminal 8 are connected so that they are possible to communicate via a network configured from the internet, LAN (Local Area Network), a public line network, a wireless communication network, combination of them, and so on. While one terminal 8 is indicated in FIG. 4, it does not mean that the number of the terminals to which the information processing device of the present invention is connected is limited to it.

First, each function block of the server 2 will be explained.

The case information memory unit 210 memorizes case information showing cases related to the inference rules. An example of the information memorized in the case information memory unit 210 is indicated in FIG. 5. In FIG. 5, the case information that each line shows includes information that identifies a case (case ID), name of the case and a related URL (Uniform Resource Locator). Also, the case information may include registration date and time and user ID of a registrant.

The inference rule memory unit 201 memorizes each inference rule explained in the first exemplary embodiment of the present invention further including the case ID. An example of the information memorized in the inference rule memory unit 201 is indicated in FIG. 6. In FIG. 6, the inference rule that each line indicates includes an inference rule ID, IF information, THEN information and the case ID. In addition, the inference rule may include registration date and time and user ID of a registrant. Also, the inference rule may include a plurality of IF information. In FIG. 6, the inference rule in which a plurality of IF information is included means that THEN information is inferred when all of the IF information is satisfied.

Further, the inference rule in which a plurality of IF information is included may mean that THEN information is inferred when either of the plurality of IF information is satisfied. Or, the inference rule in which a plurality of IF information is included may further include information that shows either of "and condition" or "or condition" as application condition of own rules. Here, "and" condition means it is applied when all of the IF information is satisfied. Also, "or condition" means that it is applied when either of the IF information is satisfied. Further, the inference rule may include a plurality of THEN information.

The case ID included in the inference rule indicates the case information related to the inference rule. When no case information related to a certain inference rule exists, the inference rule memory unit 201 does not have to include the case ID in the inference rule.

As a knowledge level of each user about each inference rule, the knowledge level memory unit 202 memorizes a numerical value included in a predetermined range. An example of information memorized in the knowledge level memory unit 202 is indicated in FIG. 7. In the example of FIG. 7, the range that the knowledge level can take is assumed to be a range of no smaller than 0 and no more than 1. Also, the smaller the numerical value is, it shows the less the user is knowledgeable about the inference rule. For example, the knowledge level about inference rule P-0001 of user U-0001 is 0.6, and the knowledge level about inference rule P-0004 is 0.1. In this case, knowledge about the inference rule P-0004 of the user U-0001 shows that it is less detailed compared with the knowledge about the inference P-0001. Further, the range that the knowledge level can take is not limited to this and can be set arbitrary.

The context information acquisition unit 203 receives the context information from the terminal 8 via a network.

By applying the inference rules memorized in the inference rule memory unit 201 in a chain reaction to the context information acquired by the context information acquisition unit 203, the inference unit 204 obtains the case information as the inference result. Here, to apply in a chain reaction means to apply other inference rules possessing IF information that THEN information of the inference rule applied satisfies. And the inference unit 204 ends inference when the inference rules further applicable do not exist any more. In case a plurality of inference rules is applicable in the inference process, the inference unit 204 continues the inference processing in a chain reaction about each of a plurality of inference rules. And when the inference ends, the inference unit 204 obtains the case information that the case ID associated with each inference rule that was applied in the inference process indicates as the inference result. That is, the inference unit 204 obtains the case information related to each inference rule applied in the inference process as the inference result. Also, if there exists no case ID associated with each inference rule that was applied until the inference ends, the inference unit 204 supposes that the inference result is not obtained. Here, concerning each case information obtained as the inference result, a list of the inference rules until the inference rule related to the case information is applied is called an inference step list of the case information.

The inference result index value calculation unit 205 calculates, for each case information derived as the inference result, an index value for the reading user on the basis of the inference step list of the case information. For example, the inference result index value calculation unit 205 may calculate the index value for the reading user of the case information obtained as the inference result using the following expression (2).

$$S(a, \text{Case}) = \min_{Loot \in Case} \left( \prod_{k \in Loot} L(a, k) \right) \quad (2)$$

In expression (2), a shows the user ID and L(a, k) shows the knowledge level of the user a about the inference rule at inference step k. Also, Case shows the case information as the inference result, and Loot shows the inference step list of the case information Case. k shows application order of each inference rule (inference step) included in the inference step list Loot, and S(a, Case) shows the index value of the case Case for the user a. Here, there is a case when one case information Case is obtained by a plurality of inference step lists Loot. Accordingly, expression (2) shows that, among no smaller than one inference step list Loot until the case information Case is obtained, one of which the multiplied value of the knowledge level of the reading user about each inference rule included is minimum is selected and made as the index value of the case information Case for the user a.

Or, the inference result index value calculation unit 205 may make an average value, a powered average and so on of the knowledge level multiplied value calculated in a plurality of inference step lists as the index value of the case information for the reading user. Additionally, the inference result index value calculation unit 205 may calculate a total, a minimum value, a power sum and so on, not limited to the multiplied value of the knowledge level of the reading user about each inference rule included in the inference step list.

The inference result presentation unit 206 sorts or filters the case information as the inference result obtained by the inference unit 204 on the basis of the index values, and sends it to the terminal 8. For example, in case the index value with a lower numerical value shows higher degree of usefulness, the inference result presentation unit 206 may send the case information that is sorted in ascending order of the index values to the terminal 8. Also, the inference result presentation unit 206 may, for example, send the case information of which a numerical value of the index value is below a threshold value to the terminal 8.

The evaluation information acquisition unit 207 receives one of a plurality of classes set in advance as the evaluation information in which the degree of the knowledge of the reading user about the case information as the inference result is evaluated from the terminal 8. For example, the evaluation information acquisition unit 207 may notify the terminal 8 to display the evaluation information of a plurality of classes set in advance about each case information as the inference result in a display form such as a drop down list that is selectable. In this case, the evaluation information acquisition unit 207 receives the class of the evaluation information selected by the user operation to the terminal 8 from the terminal 8.

The knowledge level alteration rule memory unit 208 memorizes knowledge level alteration rules that associate the classes of the evaluation information and increase/decrease values of the knowledge level. An example of the information memorized in the knowledge level alteration rule memory unit 208 is indicated in FIG. 8. In FIG. 8, the knowledge level alteration rule that each line shows includes information showing the class of the evaluation information and the increase/decrease value of the knowledge level. For example, with the evaluation information of the class as "specialized area", information as "+0.5" that means the numerical value that added 0.5 to the knowledge level so far is made a new knowledge level is associated.

Also, in this example, as the classes of the evaluation information, it is assumed that the followings are set in advance.

"Reading": shows that the reading user accessed the URL that is associated with the case information that is the inference result. In other words, it shows the evaluation that, about the case information as the inference result, the reading user deepened the knowledge by reading. Accordingly, the knowledge level alteration rule about the evaluation information shows that 0.1 is added to the respective knowledge levels supposing that the knowledge level of the reading user about each inference rule applied until the case information evaluated as "reading" is derived deepened to a certain degree.

"Verification executed": shows that the reading user verified actually that such case information is led by such inference basis. In other words, it shows the evaluation that the reading user deepened the knowledge by verification execution about the case information as the inference result. Accordingly, the knowledge level alteration rule about the evaluation information shows that 0.2 is added to the respective knowledge levels supposing that the knowledge of the reading user about each inference rule applied until the case information evaluated as "verification executed" is derived deepened to a certain degree.

"Specialized area": shows that the reading user already possesses expertise about the inference results and the inference basis. In other words, it shows the evaluation that the reading user already possesses detailed knowledge about the case information as the inference result. Accordingly, the knowledge level alteration rule about the evaluation information shows that 0.5 is added to the respective knowledge levels supposing that the knowledge of the reading user about each inference rule that was applied until the case information evaluated as "specialized area" is derived is fairly deep from the beginning.

"Oversight occurred": shows that the reading user overlooked the inference result by such inference basis, and realized it for the first time when the inference result was presented. In other words, it shows the evaluation that the reading user does not possess detailed knowledge about the case concerned such as to overlook the case information as the inference result. Accordingly, the knowledge level alteration rule about the evaluation information shows that 0.5 is subtracted from the respective knowledge levels supposing that the knowledge of the reading user about each inference rule that was applied until the case information evaluated as "oversight occurred" is derived is shallow.

"Defect embedded": shows that the reading user is a person who executed the defect case or has caused the defect same as the defect case actually. In other words, it shows the evaluation that the reading user does not possess detailed knowledge about the case concerned such as to put the defect as the inference result into effect actually. Accordingly, the knowledge level alteration rule about the evaluation information shows that 1.0 is subtracted from the respective knowledge levels supposing that the knowledge of the reading user about each inference rule that was applied until the case information evaluated as "defect embedded" is derived is very shallow.

The knowledge level update unit 209 acquires the increase/decrease values associated with the classes of the evaluation information that is acquired by the evaluation information acquisition unit 207 from the knowledge level alteration rule memory unit 208. Also, the knowledge level update unit 209 searches, about the case information that is a target of the evaluation information, a record that stored the knowledge level of the reading user about each inference rule included in the inference step list from the knowledge level memory unit 202. And the knowledge level update unit 209 updates the knowledge level of each record searched according to the knowledge level alteration rule acquired.

Also, the knowledge level update unit 209 updates the knowledge level of the target record memorized in the knowledge level update unit 209 within a range of no smaller than 0 and no more than 1. For example, the knowledge level update unit 209 updates the knowledge level that exceeds 1 by performing addition according to the knowledge level alteration rule to 1 that is the upper limit value. Also, the knowledge level update unit 209 updates the knowledge level that becomes negative by performing subtraction according to the knowledge level alteration rule to 0 that is the lower limit. Further, the knowledge level update unit 209 may update the knowledge level not only within the range of no smaller than 0 and no more than 1 but also within the predetermined range set in advance.

Next, each function block of the terminal 8 will be explained

The context information collection unit 801 collects context information from the target data. For example, the context information collection unit 801 may collect the information showing each part and the attribute information as the context information from the design document data memorized in the memory device. And the context information collection unit 801 sends the context information collected to the server 2.

The information input/output unit 802 displays the inference results received from the server 2 on the display device. The inference results received are the case information sorted or filtered on the basis of the index value as described above.

Also, the information input/output unit 802 acquires the evaluation information about the inference results displayed via the input device. At that time, the information input/output unit 802 may acquire the evaluation information of either class by displaying the evaluation information of a plurality of classes that are notified from the server 2 on the display device in a form such as a drop down list so that they are selectable. And the information input/output unit 802 sends the class of the evaluation information acquired to the server 2.

Figure 9:
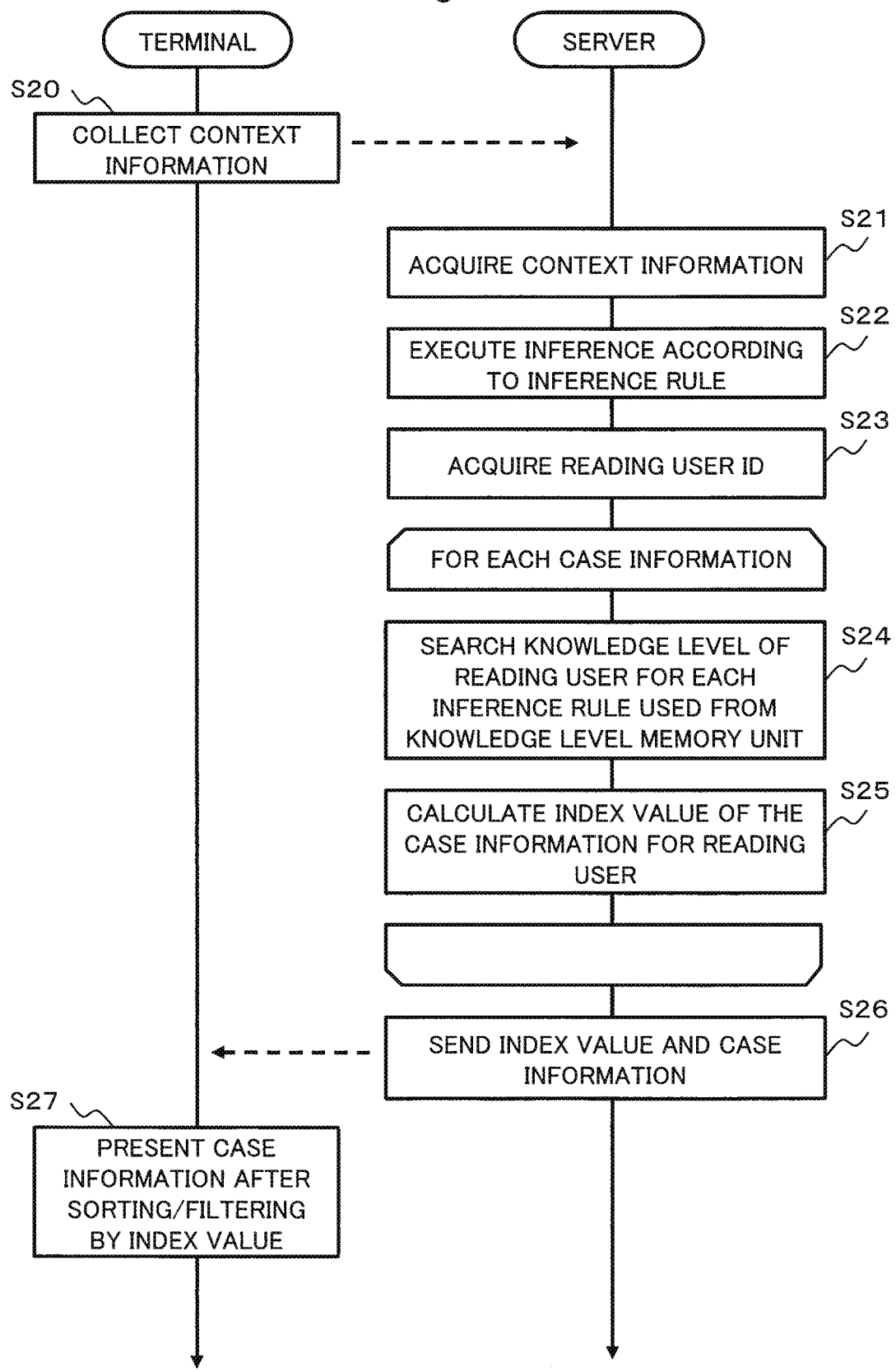
FIG. 9 is a flow chart explaining inference result presentation operation of an information processing system according to the second exemplary embodiment of the present invention.

Operation of the information processing system 20 configured as above will be explained with reference to drawings. First, operation of the information processing system 20 after it starts inference until it presents the inference results will be explained with reference to FIG. 9. FIG. 9 is a flow chart explaining inference result presentation operation of the information processing system according to the second exemplary embodiment of the present invention.

Further, in FIG. 9, it is supposed that a figure on the left shows operation of the terminal 8, a figure on the right shows operation of the server 2, and arrows of dashed lines that connect left and right show a flow of data.

In FIG. 9, first, the context information collection unit 801 of the terminal 8 collects the context information and sends it to the server 2 (Step S20).

Next, the context information acquisition unit 203 of the server 2 receives the context information (Step S21).

Next, the inference unit 204 applies the inference rules memorized in the inference rule memory unit 201 in a chain reaction to the context information received. And when the inference rules further applicable do not exist any more, the inference unit 204 acquires the case ID that is associated with each inference rule applied as the inference results (Step S22).

Next, the inference result index value calculation unit 205 acquires the reading user ID (Step S23).

Next, the inference result index value calculation unit 205 executes processing of Steps S24-S25 for each case ID obtained in Step S22.

Here, first, the inference result index value calculation unit 205 searches the knowledge level of the reading user about each inference rule included in the inference step list of the case information from the knowledge level memory unit 202 (Step S24).

Next, by applying the knowledge level searched in Step S24 to expression (2), the inference result index value calculation unit 205 calculates the index value of the case information (Step S25).

Next, the inference result presentation unit 206 notifies the terminal 8 to present the case information that each case ID obtained in Step S22 indicates on the basis of the index values calculated in Step S25 (Step S26). For example, the inference result presentation unit 206 may notify the terminal 8 to sort the case information in ascending order of the index values and present it. Further, the inference result presentation unit 206 may notify the terminal 8 to perform filtering using whether or not the numerical value of the index value is below the threshold value as a condition, and to present the case information on the basis of the result.

Next, the information input/output unit 802 of the terminal 8 presents the case information as the inference result according to the notification from the server 2 (Step S27).

As above, the information processing system 20 ends the inference result presentation operation.

Figure 10:
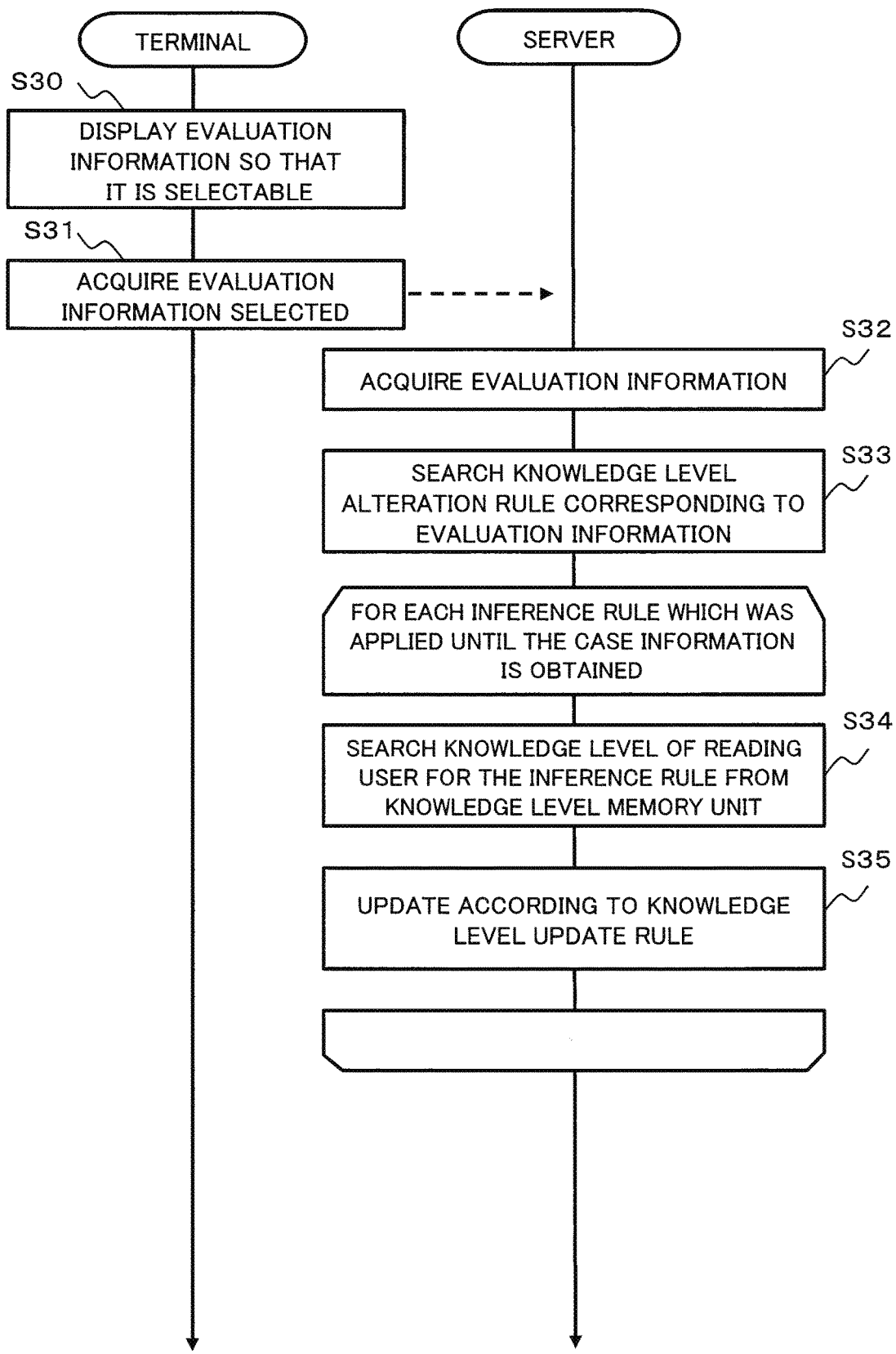
FIG. 10 is a flow chart explaining knowledge level update operation of an information processing system according to the second exemplary embodiment of the present invention.

Next, knowledge level update operation of the information processing system 20 will be explained with reference to FIG. 10. FIG. 10 is a flow chart explaining the knowledge level update operation of the information processing system according to the second exemplary embodiment of the present invention. Further, in FIG. 10, it is supposed that a figure on the left shows operation of the terminal 8, a figure on the right shows operation of the server 2, and arrows of dashed lines that connect left and right show a flow of data.

In FIG. 10, first, the information input/output unit 802 of the terminal 8 displays the evaluation information of a plurality of classes as the degree of the knowledge of the reading user about the case information as the inference result so that it is selectable (Step S30). The evaluation information of a plurality of classes is notified from the server 2 in advance. For example, the evaluation information of a plurality of classes may be, as described above, information showing "reading", "verification executed", "specialized area", "oversight occurred" and "defect embedded" respectively.

Next, the information input/output unit 802 sends, for one among the case information presented, the class of the evaluation information selected by the operation of the input device to the server 2 (Step S31).

Next, the evaluation information acquisition unit 207 of the server 2 receives the class of the evaluation information from the terminal 8 (Step S32).

Next, the knowledge level update unit 209 searches the knowledge level alteration rule about the evaluation information of the kind acquired in Step S32 from the knowledge level alteration rule memory unit 208 (Step S33).

Next, the knowledge level update unit 209 executes processing of Steps S34-S35 for each inference rule included in the inference step list of the target case information.

Here, first, the knowledge level update unit 209 searches the record including the knowledge level of the reading user about the inference rule from the knowledge level memory unit 202 (Step S34).

And the knowledge level update unit 209 updates the knowledge level of the record searched within the predetermined range according to the knowledge level alteration rule acquired in Step S33 (Step S35).

As above, the information processing system 20 ends the knowledge level update operation.

Figure 11:
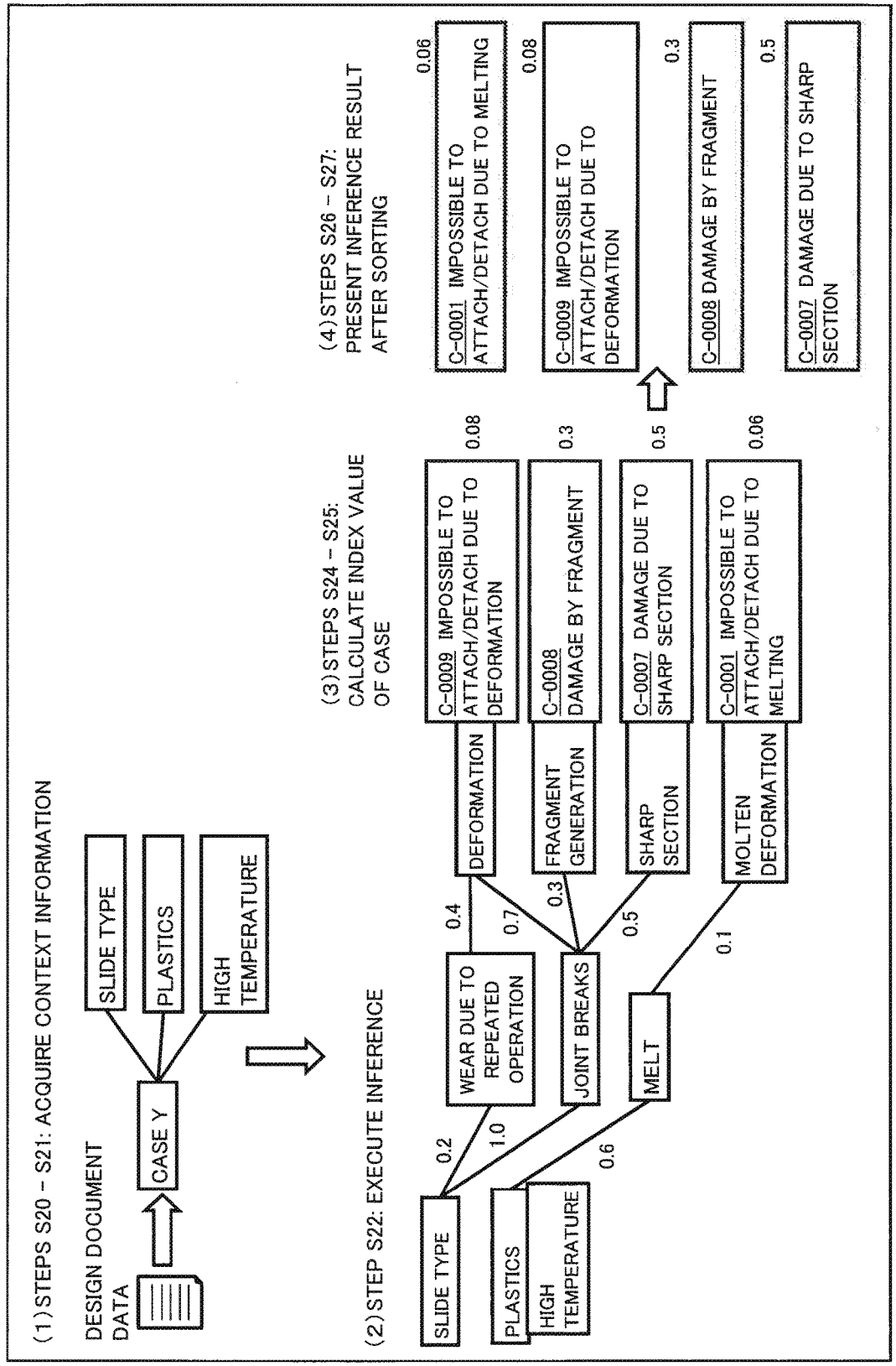
FIG. 11 is a schematic diagram explaining a specific example of inference result presentation operation of an information processing system according to the second exemplary embodiment of the present invention.

Next, a specific example of the operation of the information processing system 20 according to the second exemplary embodiment of the present invention will be explained with reference to FIG. 11. FIG. 11 is a schematic diagram explaining the specific example of the inference result presentation operation of the information processing system according to the second exemplary embodiment of the present invention. Here, it is assumed that circuit design drawing data is stored in the terminal 8.

First, the context information collection unit 801 of the terminal 8 extracts parts information and attribute information of each part from the circuit design drawing data as the context information. Here, it is supposed that the context information collection unit 801 extracted the context information such as "case Y" as the parts information, "plastics", "slide type" and "high temperature" as the attribute information from the circuit design drawing data (Step S20).

Next, the context information acquisition unit 203 of the server 2 receives the context information from the terminal 8 (Step S21).

Next, the inference unit 204 judges that the attribute information "plastics" and "high temperature" of the context information satisfy IF information of the inference rule P-0001 shown in FIG. 6.

Next, the inference unit 204 judges that THEN information "parts=>melt" of the inference rule P-0001 and the attribute information "plastics" of the case Y satisfy IF information of the inference rule P-0004.

And since there are no inference rules in which THEN information "parts=>molten deformation" of the inference rule P-0004 satisfies IF information, the inference unit 204 ends the inference processing.

Next, the inference unit 204 acquires the case ID associated for each of the inference rule P-0001 and P-0004 used in Step S22. Here, no case ID is associated with P-0001, and as the case ID, C-0001 is associated with P-0004. Accordingly, as the inference result, the inference unit 204 acquires the case C-0001 (Step S22).

Similarly, it is supposed that the inference unit 204 obtained the cases C-0007-C-0009 as indicated in FIG. 11 as the inference results by applying other inference rules (not shown) in a chain reaction to the attribute information "slide type" of the context information obtained in Step S21.

Further, in the example of FIG. 11, it is supposed that the case ID's are not associated with the inference rules that were applied during the inference processing. If there exists a case ID that is associated with the inference rules applied in between, the inference unit 204 also makes the case ID the inference result.

Next, the inference result index value calculation unit 205 calculates the index value of each case ID for the reading user. Here, it is supposed that the reading user ID is U-0001.

For example, the inference result index value calculation unit 205 obtains {inference rule P-0001, inference rule P-0004} as the inference step list for the case C-0001 as the inference result.

And the inference result index value calculation unit 205 obtains 0.6 as the knowledge level of the user U-0001 about the inference rule P-0001 by referring to the knowledge level memory unit 202 indicated in FIG. 7 (Step S24).

Similarly, the inference result index value calculation unit 205 obtains 0.1 as the knowledge level of the user U-0001 about the inference rule P-0004 by referring to the knowledge level memory unit 202 indicated in FIG. 7 (Step S24).

And the inference result index value calculation unit 205 obtains 0.06 as the index value for the user U-0001 of the case C-0001 using expression (2) (Step S25).

In the similar way, it is supposed that the inference result index value calculation unit 205 also calculated 0.5, 0.3 and 0.08 as the knowledge level respectively about the cases C-0007-C-0009. Further, in case the case ID is led by a plurality of inference step lists like the case C-0009 as the inference result in FIG. 11, the inference result index value calculation unit 205 may adopt, on the basis of expression (2), a minimum value of the knowledge level multiplied values of the reading user among each inference step list.

Next, the inference result presentation unit 206 searches the case information of the cases C-0001, C-0007-C-0009 that are inference results from the case information memory unit 210. And the inference result presentation unit 206 sorts each case information in ascending order of the index values calculated in Step S25 and sends it to the terminal 8 (Step S26).

Accordingly, the information input/output unit 802 of the terminal 8 displays information as indicated in FIG. 12 on the display device as the inference results. FIG. 12 is a figure indicating an example of the inference result presentation screen in the second exemplary embodiment of the present invention. In the example, the information input/output unit 802 of the terminal 8 displays the case information that is the inference results in ascending order of the index values. Further, in FIG. 12, each line indicates the case information that is the inference result. Also, operation button of "not inputted" indicated in a cell on the right end of each line is one for opening the input screen of information to evaluate the degree of the knowledge of the reading user about the case information. Also, the information where "already inputted" is indicated instead of the operation button of "not inputted" shows that the evaluation information of the degree of the knowledge of the reading user about the case information is already inputted.

As above, explanation of the specific example of the inference result presentation operation of the information processing system 20 ends.

Next, taking the specific inference results indicated in FIG. 12 as an example, a specific example of the knowledge level update operation of the information processing system 20 will be explained with reference to FIGS. 13-14.

FIG. 13 is an example of the input screen of the evaluation information displayed by the information input/output unit 802 of the terminal 8. The example is a screen to input the evaluation information about the case C-0001. The information input/output unit 802 displays, for example, corresponding to button down of "not inputted" operation button indicated in FIG. 12, the input screen indicated in FIG. 13. In the example, the information input/output unit 802 displays a pull-down list that can select either of "reading", "verification executed", "specialized area", "oversight occurred" and "defect embedded" as the evaluation information of a plurality of classes (Step S30).

And for example, assume a case when the information input/output unit 802 acquired the evaluation information of "verification executed" (Steps S31-S32).

Figure 14:
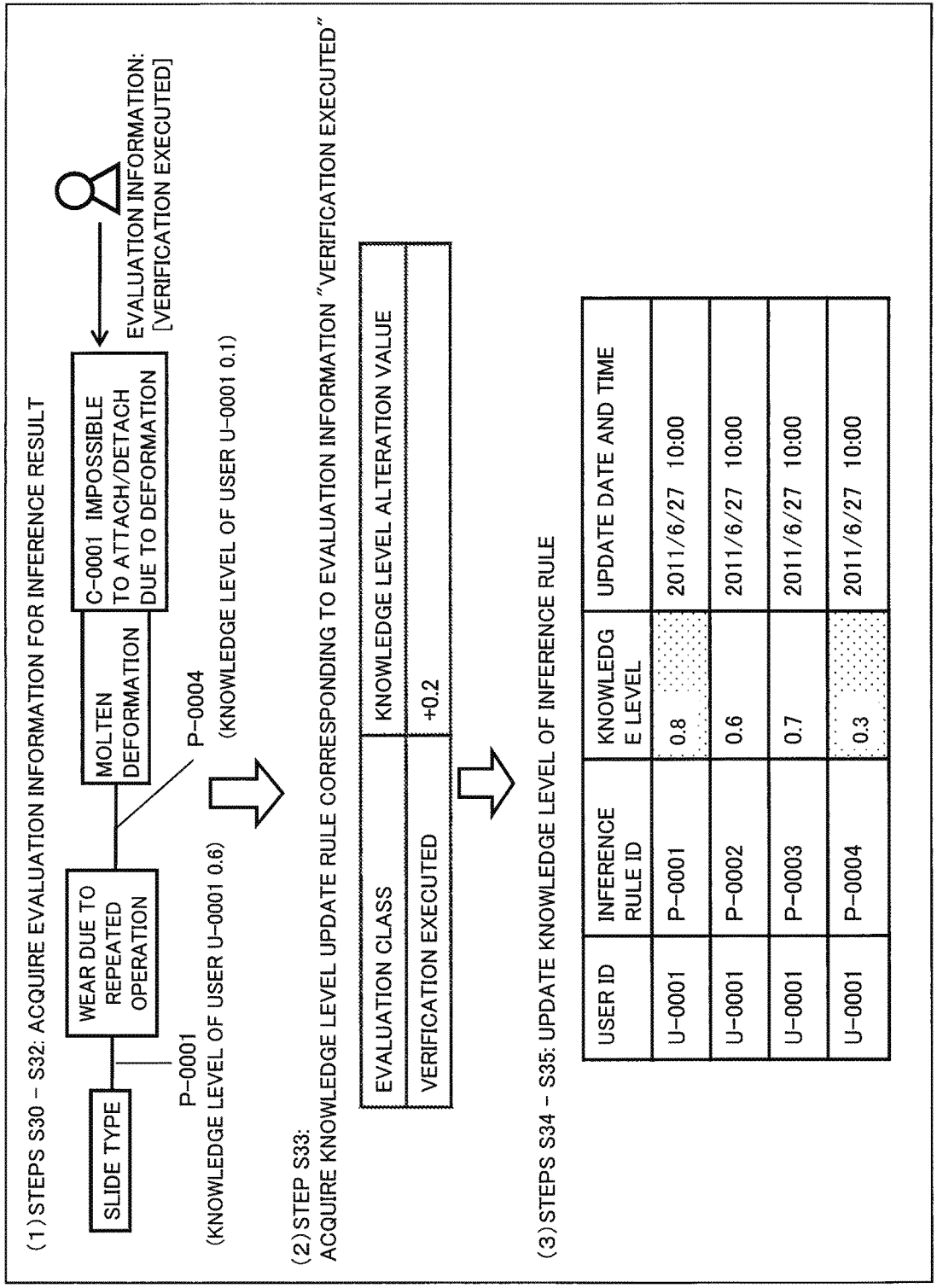
FIG. 14 is a schematic diagram explaining a specific example of knowledge level update operation of an information processing system according to the second exemplary embodiment of the present invention.

In this case, as indicated in FIG. 14, the knowledge level update unit 209 acquires the increase/decrease value "+0.2" associated with the evaluation information of "verification executed" from the knowledge level alteration rule memory unit 208 (Step S33). Further, FIG. 14 is a schematic diagram explaining a specific example of the knowledge level update operation of the information processing system according to the second exemplary embodiment of the present invention.

Next, the knowledge level update unit 209 acquires, as the ID of each inference rule included in the inference step list until the case C-0001 is obtained, P-0001 and P-0004. And the knowledge level update unit 209 searches a record including P-0001 and the reading user U-0001 and a record including P-0004 and the reading user U-0001 from the knowledge level memory unit 202 (Step S34).

And the knowledge level update unit 209 updates the knowledge level included in the records searched to a numerical value that added 0.2 to the numerical value thereof. Further, at that time, in case there is no such record concerned yet, the knowledge level update unit 209 may store a numerical value to which the increase/decrease value was applied supposing the knowledge level of the user ID about the inference rule ID concerned is 0 in the knowledge level memory unit 202 as a new record. Also, in the example, the predetermined range of the knowledge level is made no smaller than 0 and no more than 1 as described above. Accordingly, when the new knowledge level by updating exceeds 1, the knowledge level update unit 209 updates the knowledge level to 1. Similarly, when the new knowledge level updating is less than 0, the knowledge level update unit 209 updates the knowledge level to 0.

As above, explanation of the specific example of the knowledge level update operation of the server 2 ends.

Further, the server 2 may be without part or all of the inference rule memory unit 201, the knowledge level memory unit 202, the context information acquisition unit 203, the evaluation information acquisition unit 207, the knowledge level alteration rule memory unit 208 and the case information memory unit 210. Also, these components may be outside the server 2. Further, part or all of the inference rules, the knowledge levels, the context information, the evaluation information, the knowledge level alteration rules and the case information may be given to the server 2 from outside.

Next, effects of the second exemplary embodiment of the present invention will be described.

The information processing system according to the second exemplary embodiment of the present invention can present, among case information inferred from the context, the case information of which the user does not have detailed knowledge with priority.

The reason is because: the inference unit makes the case information associated with each inference rule applied to the context in a chain reaction the inference results; and the inference result evaluation unit calculates, on the basis of the knowledge levels of the reading user about each inference rule used in the inference step list until the case information is obtained, the index value showing the depth of the knowledge of the reading user about the case information comprehensively. Accordingly, the information processing system according to the second exemplary embodiment can, to the user who knows the case information but does not have the detailed knowledge about the process until the case is reached, present such case information with priority. That is, the information processing system according to the second exemplary embodiment can, about the case information as the inference result, present with priority from those of which the knowledge that the reading user has about the inference process is least. As a result, the information processing system according to the second exemplary embodiment can present with high accuracy the case information about which the user does not have detailed knowledge truly, and the case information that the user tends to make a mistake accordingly.

Also, the information processing system according to the second exemplary embodiment of the present invention can determine with higher accuracy the case information presented to each reading user with priority.

The reason is because: the evaluation information acquisition unit acquires the information for which the degree of the knowledge about the case information as the inference result was evaluated by the reading user; and the knowledge level update unit updates the knowledge level of the reading user about each inference rule used until the case information as the inference result is obtained using the knowledge level alteration rule associated with the evaluation information acquired. Accordingly, the information processing system according to the second exemplary embodiment will improve accuracy of the index values of other inference results obtained using the inference rules of which the knowledge levels were updated. As a result, even for the case information that has not been read by the user, the information processing system according to the second exemplary embodiment will not display such case information to the user with priority when the user already possesses detailed knowledge about the inference process. Also, the information processing system according to the second exemplary embodiment can, even for the case information read many times by the user, if it is the case information that tends to cause a mistake by not having the detailed knowledge truly about the inference process, display the case information to the user with priority.

(The Third Exemplary Embodiment)

Next, the third exemplary embodiment of the present invention will be explained in detail with reference to drawings. Further, in each drawing referred to in the explanation of the third exemplary embodiment, same codes are assigned to the same configurations and steps that operate similarly as the second exemplary embodiment of the present invention, and detailed explanation in the third exemplary embodiment is omitted.

Figure 15:
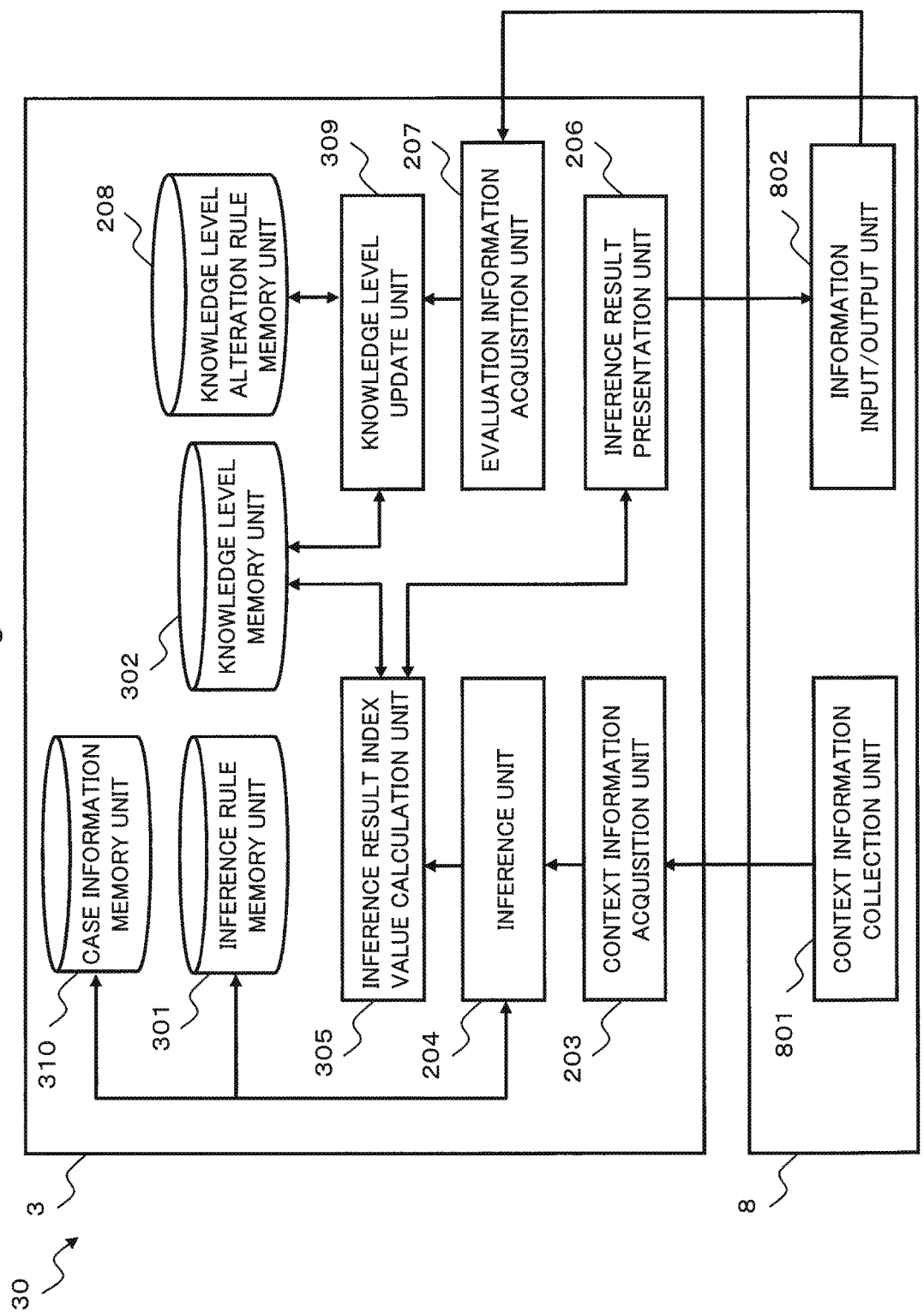
FIG. 15 is a functional block diagram of an information processing device according to a third exemplary embodiment of the present invention.

An information processing system 30 according to the third exemplary embodiment of the present invention includes a server 3 as the information processing device of the present invention and the terminal 8. Function block of each device is indicated in FIG. 15. In FIG. 15, compared to the server 2 according to the second exemplary embodiment of the present invention, the server 3 is different in a point that it is equipped with an inference rule memory unit 301 in place of the inference rule memory unit 201, a knowledge level memory unit 302 in place of the knowledge level memory unit 202, an inference result index value calculation unit 305 in place of the inference result index value calculation unit 205, a knowledge level update unit 309 in place of the knowledge level update unit 209 and a case information memory unit 310 in place of the case information memory unit 210. Further, the server 3 is configured from the computer 2600 described in FIG. 26 similar to the server 2. Also, the inference rule memory unit 301, the knowledge level memory unit 302, the inference result index value calculation unit 305, the knowledge level update unit 309 and the case information memory unit 310 are configured from the components of the computer 2600 same as the inference rule memory unit 201, the knowledge level memory unit 202, the inference result index value calculation unit 205, the knowledge level update unit 209 and the case information memory unit 210.

The inference rule memory units 301 memorizes each inference rule as illustrated in the second exemplary embodiment of the present invention in FIG. 6 further including its probability of occurrence. An example of the information memorized in the inference rule memory unit 301 is indicated in FIG. 16. In FIG. 16, for example, the inference rule P-0002 includes "0.5" as the probability of occurrence. This shows that, when the condition that output from a regulator part is high voltage is satisfied, the probability that the part generates heat is 0.5.

The knowledge level memory unit 302 memorizes, in addition to each record as illustrated in the second exemplary embodiment of the present invention in FIG. 7, records including the case ID instead of the inference rule ID further. An example of the information memorized in the knowledge level memory unit 302 is indicated in FIG. 17. In FIG. 17, each record memorized in the knowledge level memory unit 302 includes either the inference rule ID or the case ID, the user ID and the knowledge level. A record including the inference rule ID is the same as the record in the first and the second exemplary embodiment of the present invention and shows the knowledge level of the user about the inference rule. A record including the case ID shows the knowledge level of the user about the case information. Such knowledge level of the user about the case information may be registered in advance or predetermined value of 0 may be set as an initial value.

The case information memory unit 310 memorizes, as information showing the case related to the inference result, in addition to the configuration of the case information in the second exemplary embodiment of the present invention, further, information showing degree of importance of the case. An example of the information memorized in the case information memory unit 310 is indicated in FIG. 18.

The inference result index value calculation unit 305 further calculates, for each case information derived as the inference result, in addition to the knowledge level of the reading user about each inference rule included in the inference step list, on the basis of the knowledge level of the reading user about the case information, the index values of the case information. For example, the inference result index value calculation unit 305 may calculate the index value of each case information as the inference result using the following expression (3).

$$S(a, \text{Case}) = \left( \underset{Loot \in Case}{\text{Min}} \left( \prod_{k \in Loot} L(a, k) \right) \right) * Lc(a, \text{Case}) \quad (3)$$

In expression (3), Lc(a, Case) is the knowledge level of the user a about the case Case.

Also, the inference result index value calculation unit 305 may, for the index value of each case information calculated as described above, calculate the index value by further considering the degree of importance of the case information. For example, the inference result index value calculation unit 305 may make a numerical value that multiplied a reciprocal of the degree of importance of the case information to the index value calculated using expression (3) a new index value. Accordingly, among the case information for which the knowledge of the reading user about the inference process of the case information is lower, the index value of the case information of which the degree of importance of the case information itself is higher becomes smaller.

Also, the inference result index value calculation unit 305 may calculate the index value of the case information with further considering the probability of occurrence of the phenomenon for each inference rule as indicated in FIG. 16. For example, the inference result index value calculation unit 305 may make a numerical value that multiplied further power of each probability of occurrence to the multiplied value of the knowledge level of the reading user about each inference rule included in the inference step list of the case information the index value of the case information. If in case the probability of occurrence is multiplied using power of a positive exponent, the index value that is calculated for the case information obtained via the inference rules of which the probability of occurrence is lower becomes smaller. In other words, in this case, the inference result index value calculation unit 305 calculates, about the case information as the inference result that is inferred by the phenomenon with rarer frequency of occurrence, an index value that supposed the degree of usefulness to be higher (the knowledge to be less) for the reading user. Such index value is effective for example, when the reading user is an expert. Or, in case the probability of occurrence is multiplied using power of a negative exponent, the index value that is calculated for the case information obtained via the inference rules of which the probability of occurrence is higher becomes smaller. In other words, in this case, the inference result index value calculation unit 305 calculates, about the case information as the inference result that is inferred by the phenomenon with higher frequency of occurrence, an index value that supposed the degree of usefulness to be higher (the knowledge to be less) for the reading user. Such index value is effective, for example, when the reading user is a beginner. Thus, by acquiring information showing a degree of skillfulness of the reading user, the inference result index value calculation unit 305 may alter the numerical value of the exponent in the power of the probability of occurrence used at the time of calculation of the index value.

The knowledge level update unit 309 is configured similar to the knowledge level update unit 209 in the second exemplary embodiment of the present invention. Further, the knowledge level update unit 309 searches a record including the knowledge level of the reading user about the case information that is a target of the evaluation information from the knowledge level memory unit 302. And the knowledge level update unit 309 updates the knowledge level of the record searched according to the knowledge level alteration rule according to the class of the evaluation information. That is, the knowledge level update unit 309 updates the knowledge level of the reading user about the case information that is the target of the evaluation information on the basis of the evaluation information.

Operation of the information processing system 30 configured as above will be explained with reference to drawings.

Figure 19:
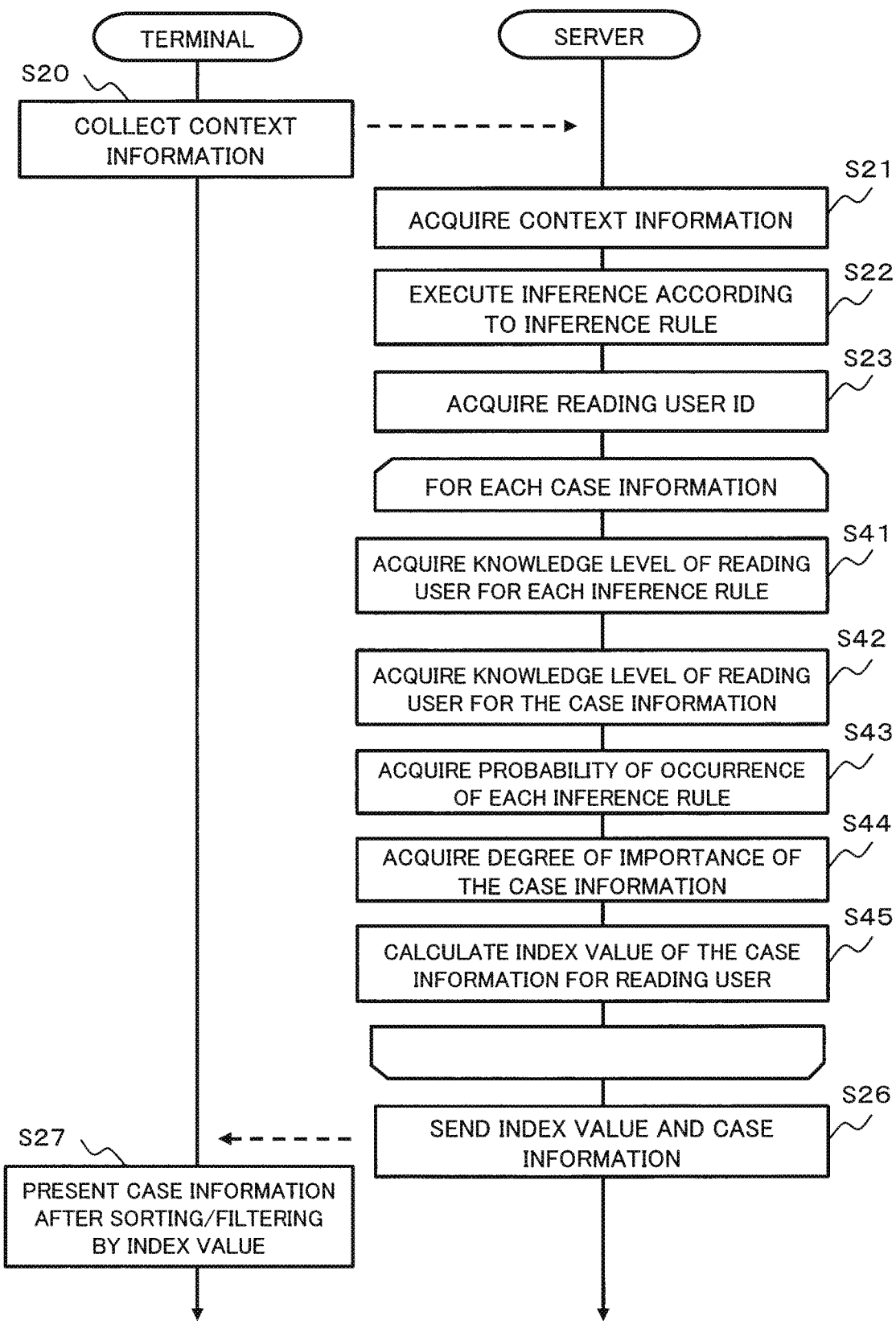
FIG. 19 is a flow chart explaining inference result presentation operation of an information processing system according to the third exemplary embodiment of the present invention.

Here, operation from the information processing system 30 starts inference until presents the inference results will be explained with reference to FIG. 19. FIG. 19 is a flow chart explaining the inference result presentation operation of the information processing system according to the third exemplary embodiment of the present invention.

In FIG. 19, first, by operating Steps S20 to S23 similar to the information processing system 20 according to the second exemplary embodiment of the present invention, the information processing system 30 applies the inference rules in a chain reaction to the context information and acquires the case IDs as the inference results.

Next, the inference result index value calculation unit 305 executes the following Steps S41-S45 for each case ID obtained in Step S22.

Here, first, the inference result index value calculation unit 305 acquires the knowledge level of the reading user about each inference rule included in the inference step list until the case information is obtained (Step S41).

Next, the inference result index value calculation unit 305 acquires the knowledge level of the reading user about the case information (Step S42).

Next, the inference result index value calculation unit 305 acquires the probability of occurrence of each inference rule included in the inference step list until the case information is obtained (Step S43).

Next, the inference result index value calculation unit 305 acquires the degree of importance of the case information (Step S44).

Next, the inference result index value calculation unit 305 calculates an index value for the reading user of the case information on the basis of each knowledge level acquired in Steps S41-S42, each probability of occurrence acquired in Step S43 and the degree of importance acquired in Step S44 (Step S45).

Further, similar to the second exemplary embodiment of the present invention, if there exists a plurality of inference step lists from which the case ID is obtained, the inference result index value calculation unit 305 executes Steps S41-S45 for each inference step list. And the inference result index value calculation unit 305 decides the index value of the case information on the basis of a plurality of candidates of the index values obtained. For example, the inference result index value calculation unit 305 may make a minimum value of the plurality of index values the index value of the case ID.

When the index value calculation processing ends for each case ID, the information processing system 30 operates Steps S26 to S27 similar to the second exemplary embodiment of the present invention, and presents the case information on the basis of the index values.

As above, the information processing system 30 ends the inference result presentation operation.

Figure 20:
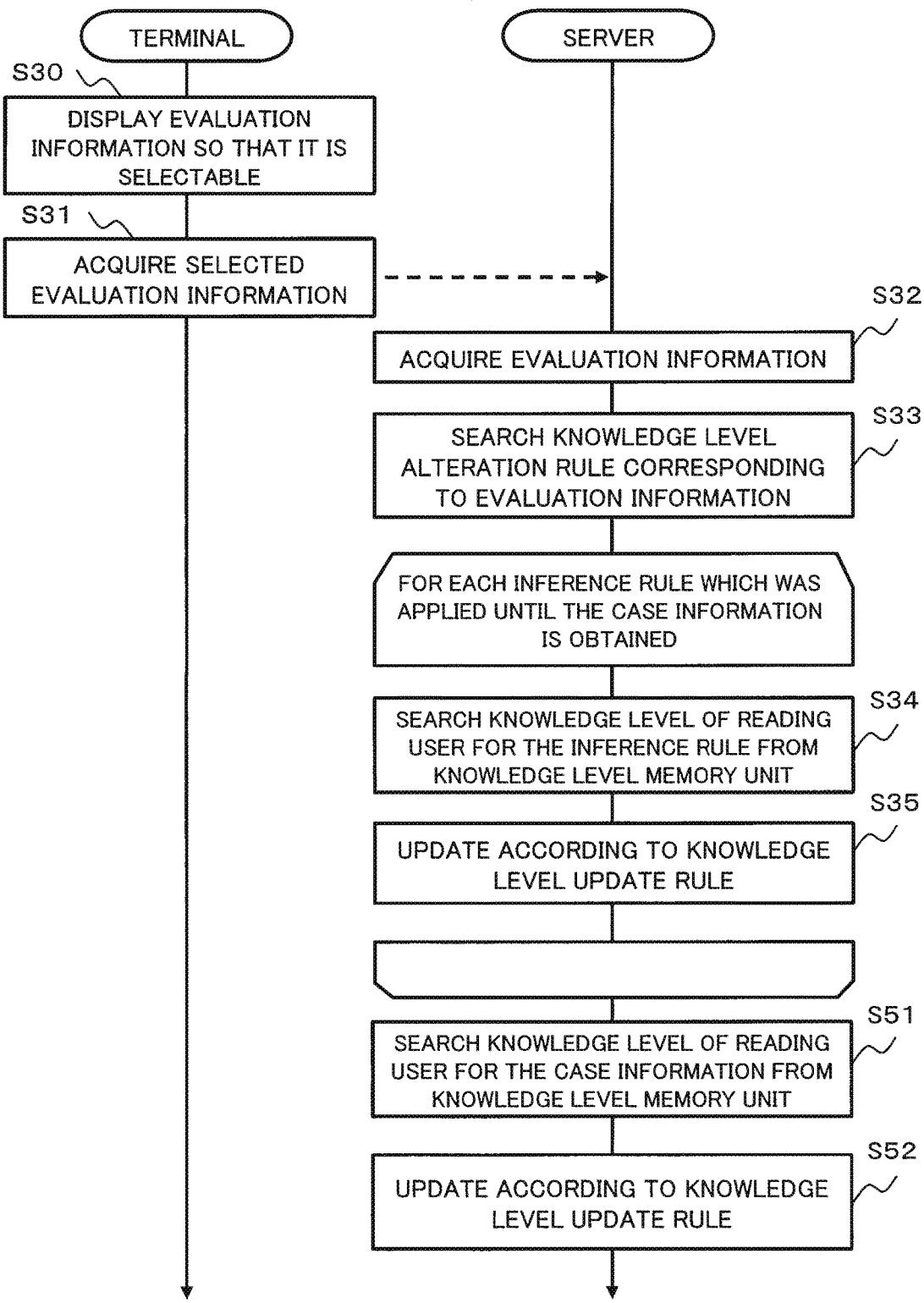
FIG. 20 is a flow chart explaining knowledge level update operation of an information processing system according to the third exemplary embodiment of the present invention.

Next, knowledge level update operation of the information processing system 30 will be explained with reference to FIG. 20. FIG. 20 is a flow chart explaining the knowledge level update operation of the information processing system according to the third exemplary embodiment of the present invention.

First, by operating Steps S30 to S35 similar to the information processing system 30 according to the second exemplary embodiment of the present invention, the information processing system 30 updates the knowledge level of the reading user about each inference rule until the case information as the inference result is obtained.

Next, the knowledge level update unit 309 searches a record including the knowledge level of the reading user about the case information of the target of the evaluation information acquired in Step S32 from the knowledge level memory unit 302 (Step S51).

Next, the knowledge level update unit 309 updates the knowledge level of the record searched in Step S51 according to the knowledge level alteration rule obtained in Step S33 (Step S52).

As above, the information processing system 30 ends the knowledge level update operation.

Further, the server 3 may be without part or all of the inference rule memory unit 301, the knowledge level memory unit 302, the context information acquisition unit 203, the evaluation information acquisition unit 207, the knowledge level alteration rule memory unit 208 and the case information memory unit 310. Also, these components may be outside the server 3. Further, part or all of the inference rules, the knowledge levels the context information, the evaluation information, the knowledge level alteration rules and the case information may be given to the server 3 from outside.

Next, effects of the third exemplary embodiment of the present invention will be described.

The information processing device according to the third exemplary embodiment of the present invention can, among the case information inferred from the context, determine with higher accuracy the case information for which the user does not have detailed knowledge as the case information presented with priority.

The reason is because the inference result index value calculation unit considers, in addition to the knowledge level of the reading user about each inference rule included in the inference step list from which the case information as the inference result is derived, the knowledge level of the reading user about the case information further and calculates the index value of the case information. Further, because the inference result index value calculation unit calculates the index value considering the probability of occurrence of each inference rule included in the inference step list from which the case information as the inference result is derived, the degree of importance of the case information itself, and so on. Accordingly, by considering not only the knowledge level of the user about the inference process but also the probability of occurrence of each inference process, the knowledge level of the user about the case itself, the degree of importance of the case itself or combination of them, the information processing system according to the third exemplary embodiment can determine the case information presented with priority on the basis of the index values with higher accuracy.

(The Fourth Exemplary Embodiment)

Next, the fourth exemplary embodiment of the present invention will be explained in detail with reference to drawings. Further, in each drawing referred to in the explanation of the fourth exemplary embodiment, same codes are assigned to the same configurations and steps that operate similarly as the third exemplary embodiment of the present invention, and detailed explanation in the fourth exemplary embodiment is omitted.

An information processing system 40 according to the fourth exemplary embodiment of the present invention includes a server 4 as the information processing device of the present invention and a terminal 9. Function block of each device is indicated in FIG. 21.

Figure 21:
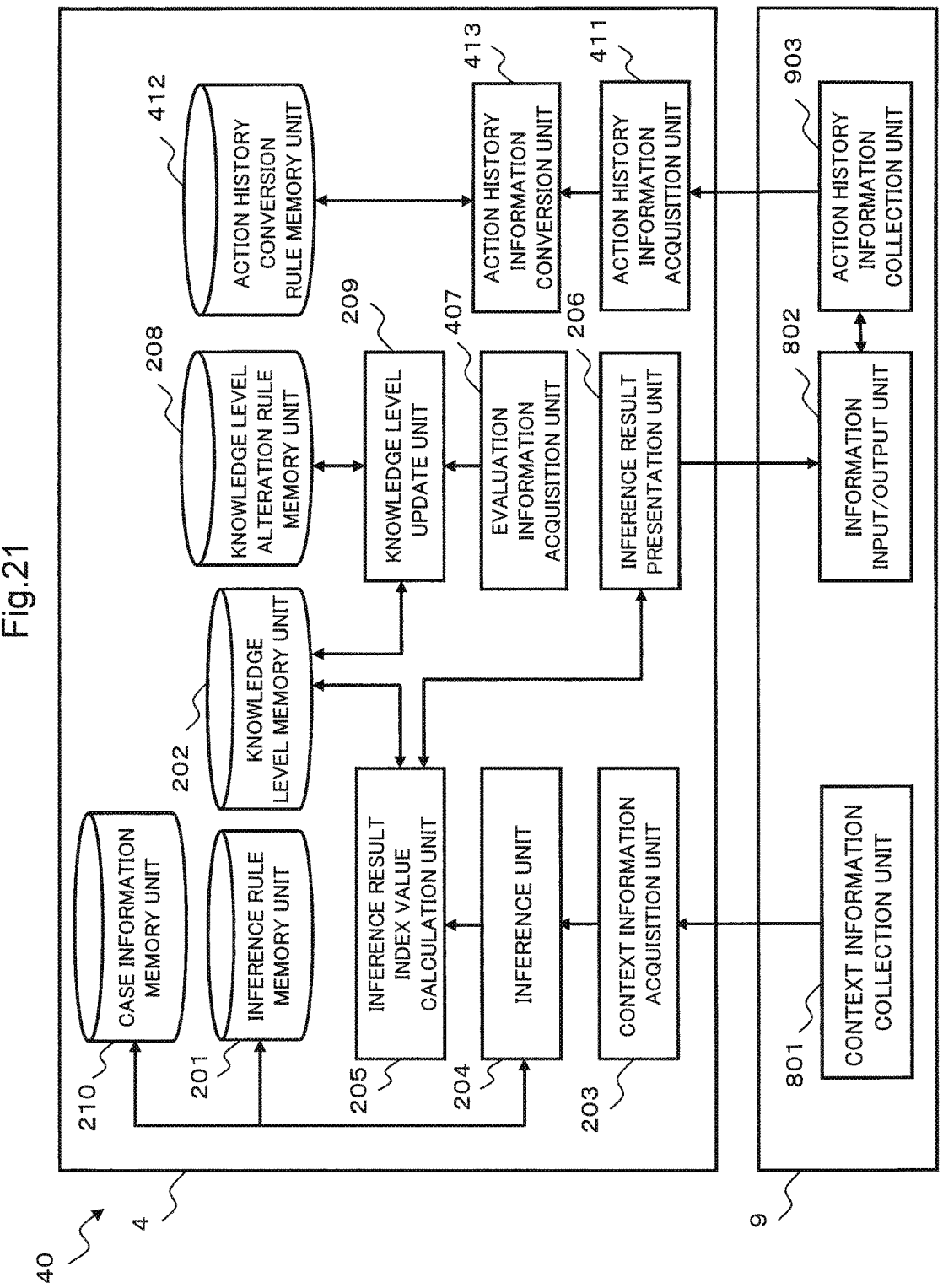
FIG. 21 is a functional block diagram of an information processing device according to a fourth exemplary embodiment of the present invention.

In FIG. 21, compared to the server 2 in the second exemplary embodiment of the present invention, the server 4 is different in a point that it is equipped with an evaluation information acquisition unit 407 in place of the evaluation information acquisition unit 207 and further, an action history information acquisition unit 411, an action history conversion rule memory unit 412 and an action history information conversion unit 413. Further, the server 4 is configured from the computer 2600 described in FIG. 26 similar to the server 2. Also, the action history information acquisition unit 411 is configured from the network interface 2605 and the CPU 2601 that reads a computer program memorized in the ROM 2603 or the memory device 2604 into the RAM 2602 and executes it. Also, the action history information conversion unit 413 is configured from the CPU 2601 that reads a computer program memorized in the ROM 2603 or the memory device 2604 into the RAM 2602 and executes it. Also, the action history conversion rule memory unit 412 is configured from the memory device 2604.

The terminal 9 is equipped with an action history information collection unit 903 in addition to the configuration same as the terminal 8 in the second exemplary embodiment of the present invention. Further, the terminal 9 is configured from the computer 2700 described in FIG. 27 similar to the terminal 8. Also, the action history information collection unit 903 is configured from the network interface 2707 and the CPU 2701 that reads a computer program memorized in the ROM 2703 or the memory device 2704 into the RAM 2702 and executes it.

Further, hardware configuration of each function block from which each device is configured is not limited to the configuration described above.

First, each function block of the server 4 will be explained.

The action history information acquisition unit 411 receives from the terminal 9, for each case information as the inference result presented on the terminal 9, action history information showing a history of action that the reading user took. For example, the action history information acquisition unit 411 may acquire as the action history information reading time of the presentation screen of the inference results on the terminal 9, access record to URL for the case information indicated in the inference results, reading time of the screen that the URL indicates, input operation history to an input column that is set up on the screen that the URL indicates and so on. Such information is collected in the terminal 9 described below.

The action history conversion rule memory unit 412 memorizes action history conversion rules that are used when the action history information about each case information is converted into the evaluation information that evaluated the degree of the knowledge of the user about the case information. An example of the information memorized in the action history conversion rule memory unit 412 is indicated in FIG. 22.

In FIG. 22, the action history conversion rule that each line indicates includes conditions about the action history information and the evaluation information. For example, the action history conversion rule in the first line shows that, when reading time about a detailed page of the case information as the inference result is no smaller than 10 seconds, the action history information is converted into the evaluation information "reading". Also, the action history conversion rule in the second line shows that, when reading time about a detailed page of the case information as the inference result is no smaller than 100 seconds and input operation to a text area for verification result input that is set in the page exists, the action history information is converted into the evaluation information "verification executed". Also, the action history conversion rule in the third line shows that, when input operation to a text area for comment input that is set in a detailed page of the case information as the inference result exists, the action history information is converted into the evaluation information "indication inputted". Also, the action history conversion rule in the fourth line shows that, when reading time of a detailed page of the case information as the inference result is no smaller than 10 seconds and access operation to an attached file to which a link is established in the page exists, the action history information is converted into the evaluation information "detailed check".

Further, an example of the information memorized in the knowledge level alteration rule memory unit 208 in case the action history conversion rule memory unit 412 memorizes the information indicated in FIG. 22 is indicated in FIG. 23. The knowledge level alteration rules indicated in FIG. 23 show the knowledge level alteration rules that are associated with the evaluation information "reading", "verification executed", "indication inputted" and "detailed check" respectively.

By applying the action history conversion rules memorized in the action history conversion rule memory unit 412 to the action history information acquired by the action history information acquisition unit 411, the action history information conversion unit 413 converts the action history information into the evaluation information.

The evaluation information acquisition unit 407 acquires the evaluation information from the action history information conversion unit 413 instead of acquiring the evaluation information selected by the input operation of the reading user.

Next, each function block of the terminal 9 will be explained.

The action history information collection unit 903 acquires the information showing the operation history about the information input/output unit 802 as the action history information. In case the information input/output unit 802 is configured from web browser application, the action history information collection unit 903 may acquire page transition history or operation history of the web browser as the action history information. And the action history information collection unit 903 sends the action history information collected to the server 4.

Knowledge level update operation of the information processing system 40 configured as above will be explained with reference to FIG. 24. FIG. 24 is a flow chart explaining the knowledge level update operation of the information processing system according to the fourth exemplary embodiment of the present invention. Further, with regard to the inference result presentation operation of the information processing system 40, because it is similar to the information processing system 20 according to the second exemplary embodiment of the present invention, its detailed explanation in the fourth exemplary embodiment will be omitted.

First, the action history information collection unit 903 of the terminal 9 collects the action history information of the user for each case information as the inference result and sends it to the server 4 (Step S60). As described above, for example, the action history information collection unit 903 may acquire the operation history information of the user about application software that presents the inference results as the action history information.

Next, the action history information acquisition unit 411 of the server 4 receives the action history information from the terminal 9 (Step S61).

Next, the action history information conversion unit 413 searches the action history conversion rules applicable to the action history information acquired in Step S61 from the action history conversion rule memory unit 412 (Step S62).

And the action history information conversion unit 413 converts the action history information into the evaluation information according to the action history conversion rule searched (Step S63).

Hereinafter, by operating Steps S33 to S35 similar to the information processing system 20 according to the second exemplary embodiment of the present invention, the information processing system 40 updates the knowledge level of the reading user about each inference rule used until the case information is obtained.

As above, the information processing system 40 ends the knowledge level update operation.

Further, the server 4 may be without part or all of the inference rule memory unit 201, the knowledge level memory unit 202, the context information acquisition unit 203, the evaluation information acquisition unit 407, the knowledge level alteration rule memory unit 208, the case information memory unit 210, the action history information acquisition unit 411 and the action history conversion rule memory unit 412. Also, these components may be outside the server 4. Further, part or all of the inference rules, the knowledge levels, the context information, the evaluation information, the knowledge level alteration rules, the case information, the action history information and the action history conversion rules may be given to the server 4 from outside.

Next, effects of the fourth exemplary embodiment of the present invention will be described.

The information processing device according to the fourth exemplary embodiment of the present invention can update the knowledge level of each user about each inference rule without workload of the user.

The reason is because the action history information acquisition unit acquires the information showing the action history of the user about the inference results presented, and the action history information conversion unit converts the action history information into the evaluation information using the action history conversion rules memorized in advance. Accordingly, because it becomes possible for the information processing device according to the fourth exemplary embodiment to acquire the evaluation information of the user to update the knowledge level for each user about the inference rules with high accuracy without resort to input work of the user.

Further, in the fourth exemplary embodiment, the action history information acquisition unit has been explained as one that acquires, as the action history information, page transition information or operation history information of the application software that presents the inference results In addition, the action history information acquisition unit in the present invention may acquire any information as far as it is the information showing the action of the user about the inference results presented and information that can be acquired by the computer device.

Also, in the fourth exemplary embodiment, the evaluation information acquisition unit may further receive the evaluation information inputted in the information input/output unit of the terminal similar to the evaluation information acquisition unit in the second or the third exemplary embodiment of the present invention. And the evaluation information acquisition unit in the fourth exemplary embodiment may adopt either one of the evaluation information inputted in the information input/output unit of the terminal and the evaluation information converted by the action history information conversion unit. For example, the evaluation information acquisition unit in the fourth exemplary embodiment may acquire the evaluation information converted by the action history information conversion unit in case the evaluation information is not inputted in the information input/output unit of the terminal.

Also, as the second to the fourth exemplary embodiment of the present invention, while the information processing system including the server and the terminal has been explained, it is possible to configure the information processing device of the present invention by realizing each function of the server and the terminal in each exemplary embodiment in one computer.

Also, in the second to the fourth exemplary embodiment of the present invention, explanation has been made focusing on the examples in which the context information is character information extracted from the circuit design document data. In addition, the context information in each exemplary embodiment may be any information as far as it is information that can be a target of inference, such as character information, image information, measurement data outputted from sensor equipment, operation log data about a device or application software and so on.

Also, in each exemplary embodiment of the present invention, explanation has been made focusing on examples in which the inference rules are in IF-THEN form. In addition, the inference rules in each exemplary embodiment may be in other forms that are used when the inference results are derived from the context information.

Also, in each exemplary embodiment of the present invention, by storing the operation of the information processing device (server and terminal) that has been explained with reference to each flow chart indicated in FIGS. 2, 3, 9, 10, 19, 20 and 24 in the memory device (storage medium) of the computer as a computer program of the present invention, and the CPU may read and execute the computer program. And in such a case, the present invention is configured from codes showing the computer program or the storage medium described above.

Also, each exemplary embodiment described above can be combined appropriately and executed.

Also, the present invention is not limited to each exemplary embodiment described above, and can be put into effect in various modes.

This application claims priority based on Japanese Patent Application No. 2011-274792 filed on Dec. 15, 2011 and the disclosure thereof is incorporated herein in its entirety.

Part or all of the exemplary embodiments mentioned above can also be described as the following supplementary notes, and they are not limited to the followings.

(Supplementary Note 1)

An information processing device comprising:

an inference unit for obtaining inference results by applying inference rules to context information;

an inference result index value calculation unit for, by using information that shows a reading user who reads the inference results, acquiring a knowledge level of the reading user about each inference rule that was applied until the inference results are obtained, and on the basis of each knowledge level acquired, calculating index values that show depth of the knowledge of the reading user about the inference results comprehensively;

an inference result presentation unit for presenting the inference results on the basis of the index values calculated by the inference result index value calculation unit; and a knowledge level update unit for, for each inference rule that was applied until the inference results are obtained, updating the knowledge level of the reading user about the inference rule concerned on the basis of evaluation information in which the degree of the knowledge that the reading user possesses is evaluated about the inference results presented by the inference result presentation unit.

(Supplementary Note 2)

The information processing device according to supplementary note 1, wherein the inference unit makes case information related to each inference rule that was applied until the inference results are obtained the inference results; and the inference result index value calculation unit calculates the index values for each case information as the inference results.

(Supplementary Note 3)

The information processing device according to supplementary note 2, wherein the inference result index value calculation unit calculates the index values, in addition to the knowledge level of the reading user about each inference rule that was applied until the inference results are obtained, further on the basis of degree of importance of the case information as the inference results.

(Supplementary Note 4)

The information processing device according to supplementary note 2 or supplementary note 3, wherein the inference result index value calculation unit calculates the index values, in addition to the knowledge level of the reading user about each inference rule that was applied until the inference results are obtained, further on the basis of the knowledge level of the reading user about the case information as the inference results, and the knowledge level update unit further updates the knowledge level of the reading user about the case information on the basis of the evaluation information.

(Supplementary Note 5)

The information processing device according to any one of supplementary note 1 to supplementary note 4, wherein the inference result index value calculation unit calculates the index values, in addition to the knowledge level of the reading user about each inference rule that was applied until the inference results are obtained, further on the basis of probability of occurrence of a phenomenon inferred by each inference rule.

(Supplementary Note 6)

The information processing device according to any one of supplementary note 1 to supplementary note 5, wherein the inference result index value calculation unit calculates the index values on the basis of a multiplied value of the knowledge level of the reading user about each inference rule that was applied until the inference results are obtained.

(Supplementary Note 7)

The information processing device according to any one of supplementary note 1 to supplementary note 6, wherein the knowledge level update unit executes the update using an increase/decrease value associated with classes of the evaluation information.

(Supplementary Note 8)

The information processing device according to any one of supplementary note 1 to supplementary note 7 further comprising: an action history information conversion unit for converting, by applying action history conversion rules to action history information that shows action history of the reading user who read the inference results presented by the inference result presentation unit, the action history information concerned into the evaluation information (Supplementary Note 9)

The information processing device according to supplementary note 8, wherein the action history information is operation history about application software that presents the inference results.

(Supplementary Note 10)

The information processing device according to any one of supplementary note 1 to supplementary note 9, wherein the knowledge level is a numerical value included in a predetermined range; and the knowledge level update unit updates the knowledge level within the predetermined range.

(Supplementary Note 11)

An information processing system comprising:

the information processing device according to any one of supplementary note 1 to supplementary note 10; and a terminal that collects context information and sends it to the information processing device, outputs the inference results presented from the information processing device to an output device, and sends the evaluation information inputted from an input device to the information processing device.

(Supplementary Note 12)

The information processing system according to supplementary note 11, wherein the information processing device is one according to supplementary note 8 or supplementary note 9, and the terminal further collects the action history information about output of the inference results, and sends it to the information processing device.

(Supplementary Note 13)

An information processing method comprising:

obtaining inference results by applying inference rules memorized in advance to context information inputted;

acquiring a numerical value memorized in advance as a knowledge level that shows depth of knowledge that a reading user who reads the inference results possesses for each inference rule that was applied until the inference results are obtained, and calculating index values that show the depth of the knowledge of the reading user about the inference results comprehensively on the basis of each knowledge level acquired;

presenting the inference results on the basis of the index values;

acquiring, for the inference results presented, evaluation information in which degree of the knowledge that the reading user possesses is evaluated; and updating, for each inference rule that was applied until the inference results are obtained, a numerical value memorized as the knowledge level of the reading user about the inference rule concerned on the basis of the evaluation information.

(Supplementary Note 14)

A computer program that makes a computer execute:

a context information acquisition processing that acquires context information;

an inference processing that obtains inference results by applying inference rules memorized in a memory device in advance to the context information;

an inference result index value calculation processing that acquires a numerical value memorized in the memory device in advance as a knowledge level that shows depth of knowledge that a reading user who reads the inference results possesses for each inference rule that was applied until the inference results are obtained, and calculates index values that show the depth of the knowledge of the reading user about the inference results comprehensively on the basis of each knowledge level acquired;

an inference result presentation processing that presents the inference results on the basis of the index values;

an evaluation information acquisition processing that acquires, for the inference results presented by the inference result presentation processing, evaluation information in which degree of the knowledge that the reading user possesses is evaluated; and a knowledge level update processing that updates, for each inference rule that was applied until the inference results are obtained, a numerical value memorized in the memory device as the knowledge level of the reading user about the inference rule concerned on the basis of the evaluation information.

REFERENCE SIGNS LIST

1 Information processing device
2, 3, 4 Server
20, 30, 40 Information processing system
8, 9 Terminal
101, 201, 301 Inference rule memory unit
102, 202, 302 Knowledge level memory unit
103, 203 Context information acquisition unit
104, 204 Inference unit
105, 20, 305 Inference result index value calculation unit
106, 206 Inference result presentation unit
107, 207, 407 Evaluation information acquisition unit
208 Knowledge level alteration rule memory unit
109, 209, 309 Knowledge level update unit
210, 310 Case information memory unit
411 Action history information acquisition unit
412 Action history conversion rule memory unit
413 Action history information conversion unit
801 Context information collection unit
802 Information input/output unit
903 Action history information collection unit
2500, 2600, 2700 Computer device
2501, 2601, 2701 CPU
2502, 2602, 2702 RAM
2503, 2603, 2703 ROM
2504, 2604, 2704 Memory device
2505, 2705 Input device
2506, 2706 Display device
2605, 2707 Network interface

What is claimed is:

1. An information processing device comprising:
at least one processor configured to implement:
an inference unit configured to obtain inference results by applying inference rules to context information;
an inference result index value calculation unit configured to, by using information that shows a reading user who reads the inference results, acquire a knowledge level of the reading user corresponding to each of the inference rules that was applied until the inference results are obtained, and on the basis of each of the acquired knowledge levels calculate an index value that comprehensively shows depth of the knowledge of the reading user relating to the inference results;
an inference result presentation unit configured to present the inference results on the basis of the index values calculated by the inference result index value calculation unit; and
a knowledge level update unit configured to, for each inference rule that was applied until the inference results are obtained, update the knowledge level of the reading user about the inference rule concerned on the basis of evaluation information in which the degree of the knowledge that the reading user possesses is evaluated about the inference results presented by the inference result presentation unit,
wherein the inference unit is further configured to make case information related to each inference rule that was applied until the inference results are obtained the inference results; and
the inference result index value calculation unit is further configured to calculate the index values for each case information as the inference results.

2. The information processing device according to claim 1, wherein the inference result index value calculation unit is further configured to calculate the index values, in addition to the knowledge level of the reading user about each inference rule that was applied until the inference results are obtained, further on the basis of degree of importance of the case information as the inference results.

3. The information processing device according to claim 1, wherein the inference result index value calculation unit is further configured to calculate the index values, in addition to the knowledge level of the reading user about each inference rule that was applied until the inference results are obtained, further on the basis of the knowledge level of the reading user about the case information as the inference results; and
the knowledge level update unit is further configured to update the knowledge level of the reading user about the case information on the basis of the evaluation information.

4. The information processing device according to claim 1, wherein the inference result index value calculation unit is further configured to calculate the index values, in addition to the knowledge level of the reading user about each inference rule that was applied until the inference results are obtained, further on the basis of probability of occurrence of a phenomenon inferred by each inference rule.

5. The information processing device according to claim 1, wherein the knowledge level update unit is further configured to execute the update using an increase/decrease value associated with classes of the evaluation information.

6. The information processing device according to claim 1, wherein the at least one processor is further configured to implement an action history information conversion unit configured to convert, by applying action history conversion rules to action history information that shows action history of the reading user who read the inference results presented by the inference result presentation unit, the action history information concerned into the evaluation information.

7. An information processing system comprising:
the information processing device according to claim 1; and
a terminal configured to collect context information and send the information as collected to the information processing device, output the inference results presented from the information processing device to an output device, and send the evaluation information inputted from an input device to the information processing device.

8. An information processing method comprising:
obtaining inference results by applying inference rules memorized in advance to context information inputted;

acquiring a numerical value memorized in advance as a knowledge level that shows depth of knowledge that a reading user who reads the inference results possesses for each of the inference rules that was applied until the inference results are obtained, and calculating an index value that comprehensively shows depth of the knowledge of the reading user relative to the inference results on the basis of each acquired knowledge level;

presenting the inference results on the basis of the index values;

acquiring, for the inference results presented, evaluation information in which degree of the knowledge that the reading user possesses is evaluated; and updating, for each inference rule that was applied until the inference results are obtained, a numerical value memorized as the knowledge level of the reading user about the inference rules concerned on the basis of the evaluation information, wherein the obtaining the inference results comprises making case information related to each inference rule that was applied until the inference results are obtained the inference results, and wherein the acquiring the numerical value comprises calculating the index values for each case information as the inference results.

9. A non-transitory computer-readable medium storing a computer program, which when executed by a computer, causes the computer to execute:

a context information acquisition processing that acquires context information;

an inference processing that obtains inference results by applying inference rules memorized in a memory device in advance to the context information;

an inference result index value calculation processing that acquires a numerical value memorized in the memory device in advance as a knowledge level that shows depth of knowledge that a reading user who reads the inference results possesses for each of the inference rules that was applied until the inference results are obtained, and calculates an index value that comprehensively shows depth of the knowledge of the reading user relative to the inference results on the basis of each acquired knowledge level;

an inference result presentation processing that presents the inference results on the basis of the index values;

an evaluation information acquisition processing that acquires, for the inference results presented by the inference result presentation processing, evaluation information in which degree of the knowledge that the reading user possesses is evaluated; and a knowledge level update processing that updates, for each inference rule that was applied until the inference results are obtained, a numerical value memorized in the memory device as the knowledge level of the reading user about the inference rule concerned on the basis of the evaluation information, wherein the inference processing comprises making case information related to each inference rule that was applied until the inference results are obtained the inference results; and wherein the inference result index value calculation processing comprises calculating the index values for each case information as the inference results.

* * * * *